US012419205B2

(12) United States Patent
Nakayama et al.

(10) Patent No.: US 12,419,205 B2
(45) Date of Patent: Sep. 23, 2025

(54) TRACTOR HAVING MECHANICAL LINKAGE FOR SELECTIVE DRAFT CONTROL OR DEPTH CONTROL

(71) Applicant: KUBOTA CORPORATION, Osaka (JP)

(72) Inventors: Daisuke Nakayama, Sakai (JP); Hironobu Nogami, Sakai (JP); Norihide Iwata, Sakai (JP); Katsumi Yanagihara, Sakai (JP); Naoto Mantoku, Sakai (JP); Keita Ono, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 770 days.

(21) Appl. No.: 17/614,066

(22) PCT Filed: May 29, 2020

(86) PCT No.: PCT/JP2020/021264
§ 371 (c)(1),
(2) Date: Nov. 24, 2021

(87) PCT Pub. No.: WO2020/241811
PCT Pub. Date: Dec. 3, 2020

(65) Prior Publication Data
US 2022/0225556 A1    Jul. 21, 2022

(30) Foreign Application Priority Data

May 29, 2019  (JP) .................................. 2019-100766
May 29, 2019  (JP) .................................. 2019-100767

(51) Int. Cl.
*A01B 63/112*    (2006.01)
*A01B 63/114*    (2006.01)

(52) U.S. Cl.
CPC .......... *A01B 63/114* (2013.01); *A01B 63/112* (2013.01)

(58) Field of Classification Search
CPC ... A01B 63/114; A01B 63/112; A01B 59/043; A01B 59/066
See application file for complete search history.

(56) References Cited

U.S. PATENT DOCUMENTS 2,527,840 A * 10/1950 Mott .................... A01B 63/1115
                                                    74/502
3,575,241 A *  4/1971 McKeon ................ A01B 67/00
                                                    172/3

(Continued)

FOREIGN PATENT DOCUMENTS

CN    105472965 B    7/2018
DE    1 209 789 B1   1/1966

(Continued)

OTHER PUBLICATIONS

JP 62122509 U—Microsoft English translation (Year: 1987).*

(Continued)

*Primary Examiner* — Joseph M Rocca
*Assistant Examiner* — Julia C Tran
(74) *Attorney, Agent, or Firm* — Keating & Bennett, LLP

(57) ABSTRACT

A tractor includes a three-point linkage to which a tiller is mountable, a hydraulic lifting/lowering driver to lift and lower the three-point linkage, and a mechanical linkage to transmit a lifting/lowering operation amount of the three-point linkage to the lifting/lowering driver. The mechanical linkage includes a load detector to detect an amount of change in traction load via the three-point linkage, a cable to interlock according to the amount of change in the traction load detected by the load detector, and a mechanical linkage interlocked and connected to the cable and the lifting/lowering driver, the mechanical linkage being capable of (Continued)

transmitting the lifting/lowering operation amount according to the amount of change in the traction load to the lifting/lowering driver.

17 Claims, 13 Drawing Sheets

(56) References Cited

U.S. PATENT DOCUMENTS

| | | | | |
|---|---|---|---|---|
| 3,674,095 | A | * | 7/1972 | Roger ................. A01B 63/1117 251/294 |
| 3,825,072 | A | * | 7/1974 | Collins ................. A01B 63/112 172/7 |
| 3,918,527 | A | * | 11/1975 | Wagner ................. A01B 63/112 172/9 |
| 4,091,877 | A | * | 5/1978 | Berg ...................... G05G 13/00 172/9 |
| 5,579,850 | A | * | 12/1996 | Kimura ............... A01B 63/1117 172/449 |
| 2010/0071919 | A1 | * | 3/2010 | Muzzy ................. A01B 63/112 172/9 |

FOREIGN PATENT DOCUMENTS

| | | |
|---|---|---|
| GB | 950566 A | 2/1964 |
| JP | 62-122509 U | 8/1987 |
| JP | 2003-102208 A | 4/2003 |
| JP | 2006-109802 A | 4/2006 |
| WO | 2018/052056 A1 | 3/2018 |

OTHER PUBLICATIONS

JPS62122509U—English google translation (Year: 1987).*
WO_2018052056_A1_-_Englsih_translation (Year: 2018).*
Official Communication issued in International Patent Application No. PCT/JP2020/021264, mailed on Jul. 14, 2020.
Official Communication issued in corresponding European Patent Application No. 20813032.8, mailed on Jun. 6, 2023.

* cited by examiner

TRACTOR HAVING MECHANICAL LINKAGE FOR SELECTIVE DRAFT CONTROL OR DEPTH CONTROL

BACKGROUND OF THE INVENTION

1. Field of the Invention

The present disclosure relates to a tractor.

2. Description of the Related Art

Conventionally, there has been known a tractor which includes a three-point linkage to which a tiller can be mounted, a hydraulic lifting/lowering driver for lifting and lowering the three-point linkage, and a mechanical linkage unit for transmitting the lifting/lowering operation amount of the three-point linkage to the lifting/lowering driver (see, e.g., JP 2006-109802 A).

The mechanical linkage unit has a load detector for detecting an amount of change in traction load via the three-point linkage, and a mechanical linkage for transmitting a lifting/lowering operation amount according to the amount of change in traction load to the lifting/lowering driver. Thus, the lifting/lowering driver lifts and lowers the three-point linkage to enable the tiller mounted to the three-point linkage to perform draft control which automatically lifts up and down according to the traction load.

SUMMARY OF THE INVENTION

In general, since there is a distance from the load detector to the lifting/lowering driver, the mechanical linkage transmits an amount of change in traction load to the lifting/lowering driver by interlocking and connecting a plurality of plate-shaped or rod-shaped link members.

Since a plurality of link members is used in the mechanical linkage, the structure of the mechanical linkage is easily complicated. As the mechanical linkage becomes more complicated, the maintenance takes more time and chattering is more likely to occur due to the large number of link members.

Accordingly, preferred embodiments of the present invention provide tractors in each of which a structure of a mechanical linkage is simple.

A tractor according to a preferred embodiment includes a three-point linkage to which a tiller is mountable, a hydraulic lifting/lowering driver to lift and lower the three-point linkage, and a mechanical linkage to transmit a lifting/lowering operation amount of the three-point linkage to the lifting/lowering driver. The mechanical linkage includes a load detector to detect an amount of change in traction load via the three-point linkage, a cable to interlock according to the amount of change in the traction load detected by the load detector, and a mechanical linkage interlocked and connected to the cable and the lifting/lowering driver, the mechanical linkage being capable of transmitting the lifting/lowering operation amount according to the amount of change in the traction load to the lifting/lowering driver.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
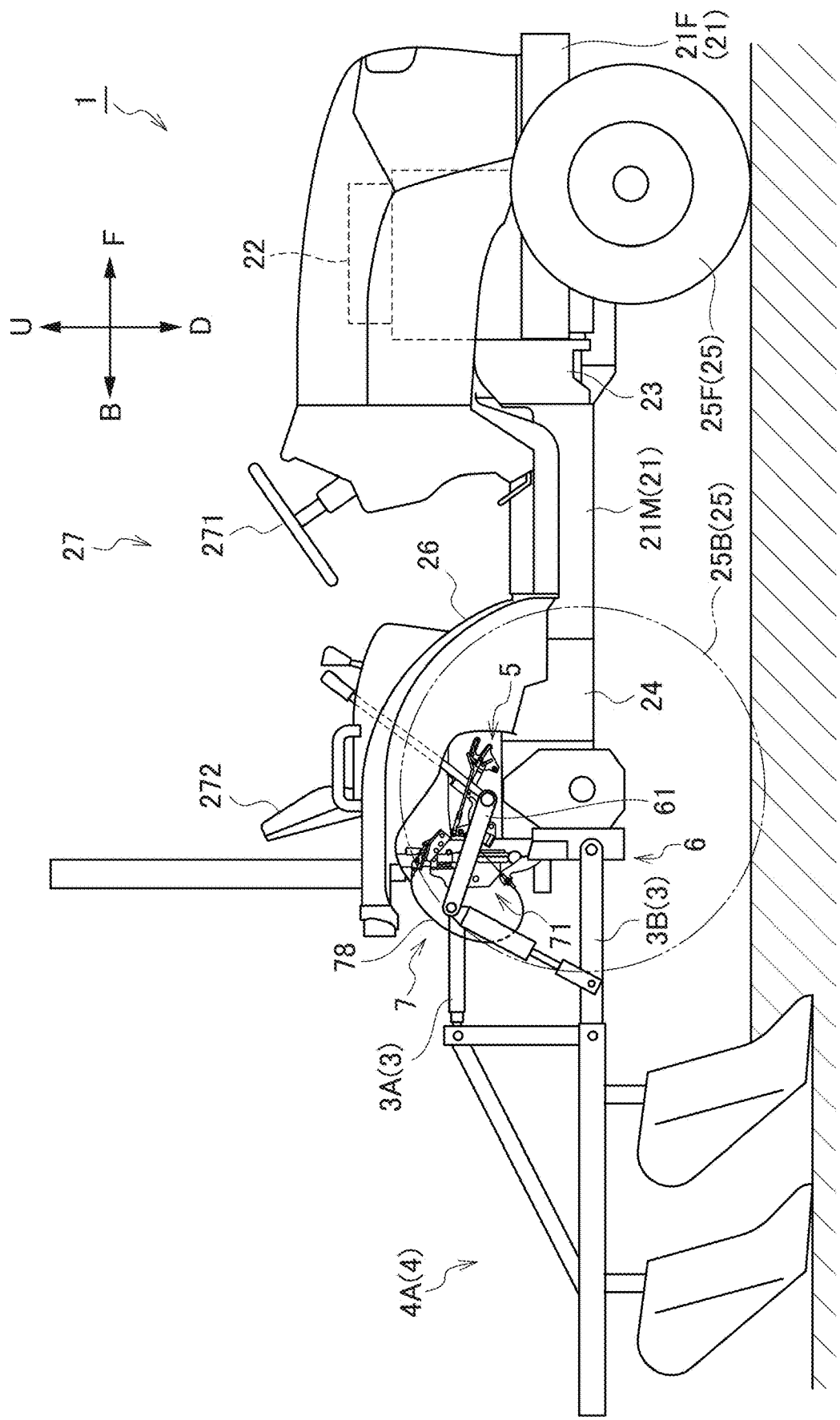
FIG. 1 is a right side view of a tractor according to a first preferred embodiment of the present invention.

A tractor according to a preferred embodiment of the present invention includes a three-point linkage to which a tiller is mountable, a hydraulic lifting/lowering driver to lift and lower the three-point linkage, and a mechanical linkage to transmit a lifting/lowering operation amount of the three-point linkage to the lifting/lowering driver. The mechanical linkage includes a load detector to detect an amount of change in traction load via the three-point linkage, a cable to interlock according to the amount of change in the traction load detected by the load detector, and a mechanical linkage interlocked and connected to the cable and the lifting/lowering driver, the mechanical linkage being capable of transmitting the lifting/lowering operation amount according to the amount of change in the traction load to the lifting/lowering driver.

Thus, in the mechanical linkage, the cable can carry a portion of the transmission path to transmit the amount of change in traction load from the load detector to the lifting/lowering driver. Therefore, the amount of change in traction load can be transmitted to the lifting/lowering driver without increasing the number of plate-like or rod-like link members constituting the mechanical linkage. Thus, increasing the number of the link members is prevented, and the structure of the mechanical linkage can be made less complicated.

According to a preferred embodiment of the present invention, the cable may include a first connecting portion connected on the mechanical linkage side and a second connecting portion connected on the load detector side, and a portion extending from the second connecting portion toward a backward direction of the tractor. One end of the cable can be connected to the mechanical linkage toward a forward direction of the tractor, and another end of the cable can be connected to the load detector toward a forward direction of the tractor.

Thus, an operator positioned in the rear of the tractor can recognize each connecting portion by tracing the cable from the rear of the tractor. Therefore, the operator can easily perform the maintenance work such as cable inspection and replacement work.

According to a preferred embodiment of the present invention, the cable may include a first connecting portion connected on the mechanical linkage side, and a second connecting portion connected on the load detector side. The tractor may include a mounting portion to which the second connecting portion is mounted, and a swing that swings back and forth according to a back and forth swing of the load detector. The cable can extend curvedly so that when the second connecting portion swings forward together with the swing, the first connecting portion is pulled backward, and when the second connecting portion swings backward together with the swing, the first connecting portion is pulled forward, in a side view of the tractor. The second connecting portion can be mounted to the mounting portion at a position higher than the first connecting portion.

The operator can carry the second connecting portion to the mounting portion without causing the operator to move significantly by bending the cable in the maintenance work. In addition, since the second connecting portion is positioned at a position higher than the first connecting portion, the second connecting portion can be mounted at a position close to the height of the operator's eye line. The operator can easily perform the maintenance work.

According to a preferred embodiment of the present invention, the cable may include an inner cable that swings according to a back and forth swing of the swing, a cover portion that covers an outside of the inner cable, and a cable fixing portion that fixes the cover portion.

Fixing the cover portion by the cable fixing portion allows the swinging path of the inner cable to be fixed, and the inner cable to be stably swung according to the back and forth swing of the swing. Thus, the mechanical linkage unit can accurately transmit the lifting/lowering operation amount according to the amount of change in traction load to the lifting/lowering driver, so that a high quality draft control can be executed.

According to a preferred embodiment of the present invention, the tractor may include a swing that swings back and forth according to a back and forth swing of the load detector. The mechanical linkage may include a sensitivity adjuster to adjust an operation sensitivity when the lifting/lowering driver interlocks with the swing. The cable may be connected to the swing and the sensitivity adjuster.

Since the cable directly connects the swing and the sensitivity adjuster, the number of links connecting the swing and the sensitivity adjuster can be reduced, and the structure of the hydraulic lifting/lowering device is simplified.

According to a preferred embodiment of the present invention, at least a portion of the mechanical linkage can be positioned farther rearward than the front end of the lower link of the three-point linkage. The mechanical linkage can be easily confirmed from the rear of the tractor, so that the maintainability can be improved.

According to a preferred embodiment of the present invention, the cable may include a first connecting portion connected on the mechanical linkage side, and a second connecting portion connected on the load detector side. A mounting portion to which the second connecting portion can be mounted is positioned above the load detector.

Thus, the second connecting portion and the mounting portion are easily confirmed from the rear of the tractor, and the second connecting portion is easily mounted and removed. Therefore, the maintenance work can be easily performed. A space including the mounting portion of the second connecting portion is not required in front of the load detector.

According to a preferred embodiment of the present invention, the cable may include a first connecting portion connected on the mechanical linkage side, and a second connecting portion connected on the load detector side. The mechanical linkage may include a first mounting portion to which the first connecting portion is mounted, and a second mounting portion to which the second connecting portion is mounted. The second mounting portion can be positioned farther rearward than the first mounting portion in a state where the traction load is not applied.

Thus, since the distance from the rear of the tractor to the second mounting portion is closer than that to the first mounting portion, the second connecting portion is easily mounted and removed from the rear of the tractor. Therefore, the maintenance work can be easily performed.

According to a preferred embodiment of the present invention, the mechanical linkage may include an amplification swing that is supported by the load detector so as to be swingable and swings back and forth according to a back and forth swing of the load detector. The amount of change in the traction load can be amplified by the back and forth swing of the amplification swing.

Thus, the tiller can be quickly lifted and lowered according to the change of the traction load. Consequently, even when the traction load rapidly increases, the engine stall caused by the increase of the traction load can be avoided.

According to a preferred embodiment of the present invention, a state in which the lifting/lowering operation amount according to the amount of change in the traction load amplified by the back and forth swing of the amplification swing is transmitted to the lifting/lowering driver and a state in which the lifting/lowering operation amount according to the amount of change in the traction load not amplified by the back and forth swing of the amplification swing is transmitted to the lifting/lowering driver can be switched.

Thus, the operator can lift and lower the three-point linkage according to the condition of the soil in which the traction work is to be performed (e.g., hardness of soil, and content ratio of stone, rock and wood).

According to a preferred embodiment of the present invention, a first connecting portion which is a connecting portion on one side of the cable can be connected to the mechanical linkage. The cable can selectively transmit the amount of change in the traction load and an amount of change in tilling depth A connection destination of a second connecting portion which is a connecting portion on another side of the cable is switched, whereby either one of a first lifting/lowering operation amount according to the amount of change in the traction load and a second lifting/lowering operation amount according to the amount of change in the tilling depth is selected as the lifting/lowering operation amount transmitted to the lifting/lowering driver.

In order to switch the connection destination of the second connecting portion of the cable, the mechanical linkage connected to the first connecting portion of the cable is a linkage common to both draft control and automatic tilling depth control. Therefore, since similar functions of the draft control and the automatic tilling depth control can be combined into one linkage, the structure of the hydraulic lifting/lowering device can be made less complicated. The cable is more flexible than a plate-like or rod-like link member used in a general mechanical linkage. Therefore, the degree of freedom in the disposition of the connection destination of the cable is increased, and the structure of the hydraulic lifting/lowering device can be made less complicated. In addition, switching the connection destination of the cable having a wide movable range by the flexibility allows the switching work between the draft control and the automatic tilling depth control to be easily performed.

According to a preferred embodiment of the present invention, the tractor may include a mounting portion for draft control to which the second connecting portion is mounted when the first lifting/lowering operation amount is selected as the lifting/lowering operation amount, and a mounting portion for automatic tilling depth control to which the second connecting portion is mounted when the second lifting/lowering operation amount is selected as the lifting/lowering operation amount. The mounting portion for draft control can be positioned more forward than a front end of a top link of the three-point linkage. The mounting portion for automatic tilling depth control can be positioned farther rearward than a rear end of the top link.

When the operator performs the switching work between the draft control and the automatic tilling depth control, the operator can work between the front end and the rear end of the top link in a side view of the tractor, and can easily perform the switching work between the draft control and the automatic tilling depth control.

According to a preferred embodiment of the present invention, the tractor may include a mounting portion to which the second connecting portion is mounted when the first lifting/lowering operation amount is selected as the lifting/lowering operation amount. The cable may include a portion extending from the second connecting portion toward a backward direction of the tractor. The second connecting portion can be mounted to the mounting portion toward a forward direction of the tractor.

When selecting the first lifting/lowering operation amount as the lifting/lowering operation amount, that is, when switching to the draft control, the operator positioned at the rear of the tractor can easily carry the second connecting portion to the mounting portion by gripping the portion (extension portion) extending toward the backward direction of the tractor so that the second connecting portion is positioned more to the front side of the operator than the extension portion. Therefore, the operator can easily perform the switching work to the draft control.

According to a preferred embodiment of the present invention, the tractor may include a load detector to swing back and forth according to the traction load transmitted through a top link of the three-point linkage, a mounting portion to which the second connecting portion is mounted, and a swing to swing back and forth according to a back and forth swing of the load detector. The cable can extend curvedly so that when the second connecting portion swings forward together with the swing, the first connecting portion is pulled backward, and when the second connecting portion swings backward together with the swing, the first connecting portion is pulled forward, in a side view of the tractor. The second connecting portion can be mounted to the mounting portion at a position higher than the first connecting portion.

When switching to the draft control, the operator can carry the second connecting portion to the mounting portion without causing the operator to move significantly by bending the cable. In addition, since the second connecting portion is positioned at a position higher than the first connecting portion, the second connecting portion can be mounted at a position close to the height of the operator's eye line. The operator can easily perform the switching work to the draft control.

According to a preferred embodiment of the present invention, the cable may include an inner cable to swing according to a back and forth swing of the swing, a cover portion that covers an outside of the inner cable, and a cable fixing portion that fixes the cover portion.

Fixing the cover portion by the cable fixing portion allows the swinging path of the inner cable to be fixed, and the inner cable to be stably swung according to the back and forth swing of the swing. Thus, the mechanical linkage can accurately transmit the lifting/lowering operation amount according to the amount of change in traction load to the lifting/lowering driver, so that a high quality draft control can be executed.

According to a preferred embodiment of the present invention, the tractor may include a load detector to swing back and forth according to the traction load transmitted through a top link of the three-point linkage, and a swing that swings back and forth according to a back and forth swing of the load detector. The mechanical linkage may include a sensitivity adjuster to adjust an operation sensitivity when the lifting/lowering driver interlocks with the swing. The cable can be connected to the swing and the sensitivity adjuster.

Since the cable directly connects the swing and the sensitivity adjuster, the number of link members connecting the swing and the sensitivity adjuster can be reduced, and the structure of the hydraulic lifting/lowering device is simplified.

According to a preferred embodiment, at least a portion of the mechanical linkage can be positioned farther rearward than a front end of a lower link of the three-point linkage.

The mechanical linkage can be easily confirmed from the rear of the tractor, so that the maintainability can be improved.

According to a preferred embodiment of the present invention, the tractor may include a load detector to swing back and forth according to the traction load transmitted through a top link of the three-point linkage, and a mounting portion to which the second connecting portion is mounted when the first lifting/lowering operation amount is selected as the lifting/lowering operation amount. The mounting portion can be positioned above the load detector.

Thus, when the automatic tilling depth control is switched to the draft control, the second connecting portion and the mounting portion is easily confirmed from the rear of the tractor, and the connection destination of the second connecting portion is easily switched. Therefore, the switching work can be easily performed.

According to a preferred embodiment of the present invention, the tractor may include a hitch to connect the tiller at a rear of the three-point linkage. The hitch may include a linkage that swings back and forth according to the amount of change in tilling depth. The linkage may include a mounting portion to which the second connecting portion is mounted when the second lifting/lowering operation amount is selected as the lifting/lowering operation amount.

Thus, since the second connecting portion of the cable is directly mounted to the linkage of the hitch, the number of members for transmitting the amount of change in tilling depth to the cable can be reduced on the front side of the three-point linkage as compared with the case where the second connecting portion of the cable is mounted.

Conventionally, a tractor including a hydraulic lifting/lowering device is widely known. As such a tractor, JP 2006-109802 A discloses a tractor including a mechanical linkage for draft control. A mechanical linkage (draft feedback linkage) for draft control in JP 2006-109802 A transmits a lifting/lowering operation amount according to an amount of change in traction load detected via a top link of a three-point linkage to a lifting/lowering driver (e.g., control valve). The lifting/lowering driver performs lifting/lowering drive of the three-point linkage according to the lifting/lowering operation amount, whereby a traction type tiller (e.g., plow) mounted to the three-point linkage automatically lifts up and down according to the traction load. As described above, the tractor in JP 2006-109802 A can perform draft control when carrying out the tilling work by the traction type tiller, so that the traction load can be kept constant, and the occurrence of engine stall caused by the increase of the traction load can be avoided.

As an example of a tractor including a hydraulic lifting/lowering device, JP 2003-102208 A discloses a tractor including a mechanical linkage for automatic tilling depth control. The mechanical linkage (intermediate linkage) for automatic tilling depth control in JP 2003-102208 A transmits a lifting/lowering operation amount according to an amount of change in tilling depth detected via a linkage (e.g., swing arm, interlocking link, linkage link, and sensor wire) provided in a rotary tiller to a lifting/lowering driver (e.g., position control valve). The lifting/lowering driver performs lifting/lowering drive of the three-point linkage according to the lifting/lowering operation amount, whereby the rotary tiller mounted to the three-point linkage automatically lifts up and down according to the tilling depth. As described above, the tractor in JP 2003-102208 A can perform the automatic tilling depth control when carrying out the tilling work by the rotary tiller, so that tilling work with high accuracy can be performed with the tilling depth kept constant.

The tractor in JP 2006-109802 A does not include a mechanical linkage for automatic tilling depth control. Therefore, when the tilling work is performed by the rotary tiller, the automatic tilling depth control cannot be performed, and it has been difficult to perform tilling work with high accuracy in which the tilling depth is kept constant. On the other hand, the tractor in JP 2003-102208 A does not include a mechanical linkage for draft control. Therefore, when the tilling work is performed by the traction type tiller, the draft control cannot be performed, and an engine stall may occur due to the increase of the traction load. In order to accommodate both of the tilling works, it is envisioned that the hydraulic lifting/lowering device includes both a mechanical linkage for automatic tilling depth control and a mechanical linkage for draft control. However, there is a problem that the structure of the hydraulic lifting/lowering device is made much more complicated by providing both mechanical linkages. As the structure becomes more complicated, the maintenance takes more time and chattering is more likely to occur due to the number of link members constituting the mechanical linkage. Therefore, in order to provide a tractor capable of performing draft control and automatic tilling depth control, in which the structure of the hydraulic lifting/lowering device is simplified, the tractor may have the following structure.

A tractor according to one aspect of a preferred embodiment of the present invention includes a three-point linkage to which a tiller can be mounted, a hydraulic lifting/lowering driver to lift and lower the three-point linkage, and a mechanical linkage to transmit a lifting/lowering operation amount of the three-point linkage to the lifting/lowering driver. The mechanical linkage includes a cable to selectively transmit an amount of change in traction load and an amount of change in tilling depth, and a mechanical linkage interlocked and connected to the cable and the lifting/lowering driver. A first connecting portion which is a connecting portion on one side of the cable is connected to the mechanical linkage. A connection destination of a second connecting portion which is a connecting portion on an other side of the cable is switched, such that either one of a first lifting/lowering operation amount according to the amount of change in traction load and a second lifting/lowering operation amount according to the amount of change in tilling depth is selected as the lifting/lowering operation amount transmitted to the lifting/lowering driver.

Preferred embodiments of the present disclosure will be described in detail with reference to the accompanying drawings. In the following drawings, the same or similar reference numerals denote the same or similar portions. However, it should be noted that the drawings are schematic, and the proportions of each dimension are different from the actual figures. Therefore, specific dimensions should be determined in consideration of the following explanation. Further, the drawings may include portions having different dimensional relationships and ratios between the drawings. In the present description and drawings, elements having substantially the same functions and structures are denoted by the same reference numerals, and redundant description thereof is omitted, and elements not directly related to the present disclosure are omitted from illustration.

First Preferred Embodiment

A schematic configuration of a tractor will be described with reference to FIG. 1. FIG. 1 is a right side view of the tractor according to the present preferred embodiment. In the drawing, an arrow F indicates the forward direction (forward) of the tractor, an arrow B indicates the backward direction (backward) of the tractor, an arrow U indicates the upward direction (upward) of the tractor, an arrow D indicates the downward direction (downward) of the tractor, an arrow R indicates the rightward direction (rightward) of the tractor, and an arrow L indicates the leftward direction (leftward) of the tractor. As illustrated in FIG. 1, the tractor 1 illustrated in the present preferred embodiment includes a vehicle body 2, a three-point linkage 3, and a hydraulic lifting/lowering device 5. The vehicle body 2 includes a frame 21, an engine 22, a clutch housing 23, a transmission case (hereinafter referred to as a T/M case) 24, a wheel 25, a rear fender 26, a riding type operation section 27, and a cylinder case 28, for example.

The frame 21 includes a front frame 21F positioned at the front of the vehicle body 2 and an intermediate frame 21M connected to the rear end of the clutch housing 23. The engine 22 is connected to the rear of the front frame 21F. The clutch housing 23 is connected to the rear end lower portion of the engine 22. The T/M case 24 is connected to the rear end of the intermediate frame 21M. The T/M case 24 is also used as a rear frame. The wheel 25 includes left and right front wheels 25F disposed on the right and left sides of the front frame 21F, and right and left rear wheels 25B disposed on the left and right sides of the T/M case 24. The rear fender 26 covers the right and left rear wheels 25B. The operation section 27 has a steering wheel 271 for front wheel steering and a driver seat 272 positioned between right and left rear fenders 26. The cylinder case 28 houses, for example, a control valve 63 to be described below. The driver seat is disposed above the cylinder case 28.

Although not illustrated, the power from the engine 22 is transmitted to the main transmission included in the T/M case 24 via, for example, the main clutch included in the clutch housing 23 and a transmission shaft covered with the intermediate frame 21M. The power after the shift by the main transmission is transmitted to the wheels 25 via, for example, an auxiliary transmission included in the T/M case 24.

The three-point linkage 3 can mount a tiller 4. The three-point linkage 3 is connected to the rear of the T/M case 24 so as to be vertically swingable. The three-point linkage 3 has a single top link 3A and right and left lower links 3B. When the tilling work is performed by the tractor 1, a traction type tiller 4A can be mounted to the three-point linkage 3. The present preferred embodiment illustrates the state where a plow is mounted to the three-point linkage 3 as an example of the traction type tiller 4A. A disc harrow, a cultivator, or a subsoiler, for example, can be mounted to the three-point linkage 3 as the traction type tiller 4A.

As illustrated in FIG. 1, the front end of the top link 3A is connected to a load detector 71 (load detector 711) to be described below via a connection pin. The front ends of the right and left lower links 3B are connected to right and left brackets provided on the rear end of the T/M case 24 via right and left connection pins. This connection structure allows the traction load during tilling work to act on the load detector 711 via the top link 3A.

The hydraulic lifting/lowering device 5 is of a mechanical linkage type. The hydraulic lifting/lowering device 5 is disposed on the rear side of the tractor. The configuration of the hydraulic lifting/lowering device 5 is illustrated below.

Figure 2:
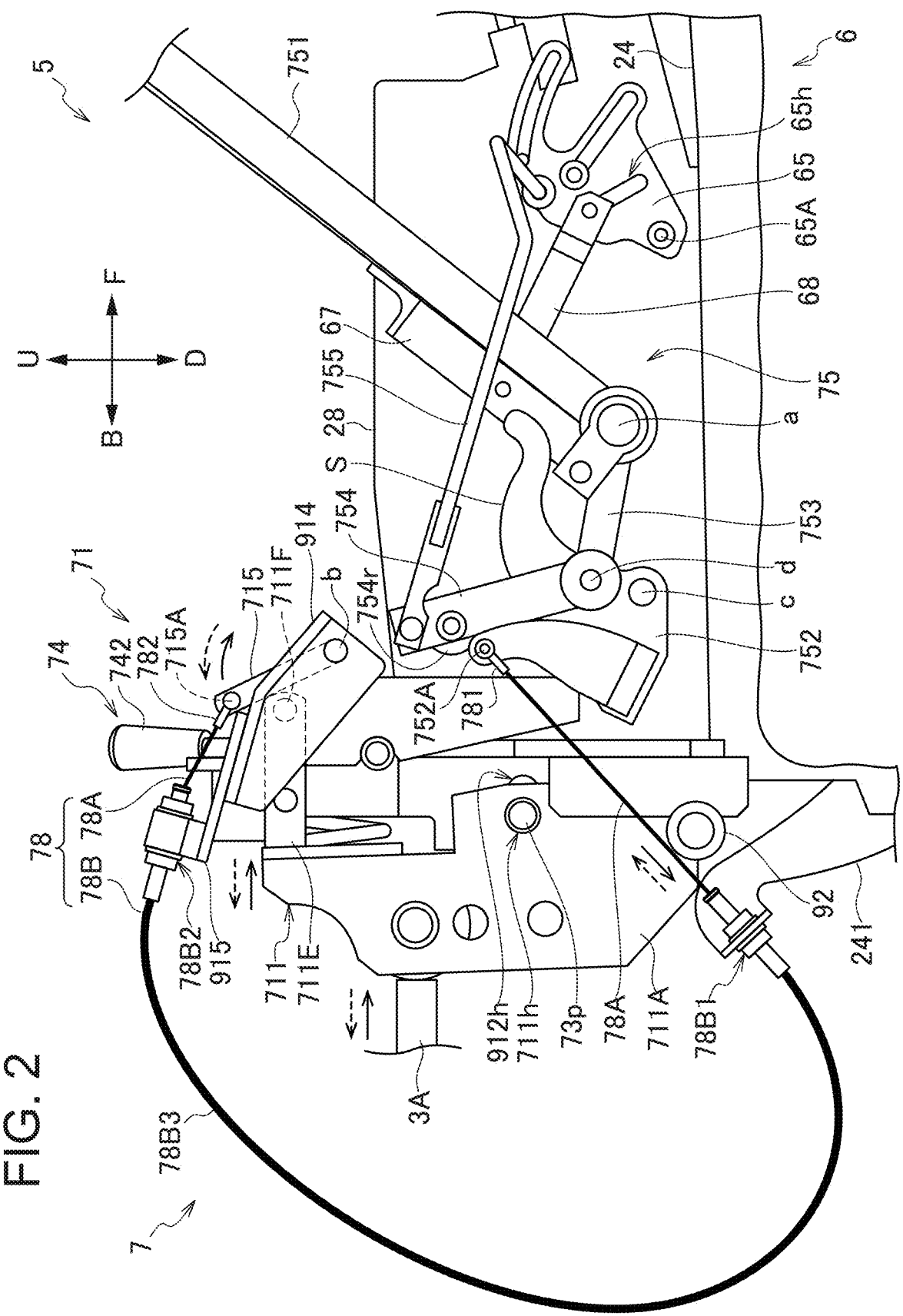
FIG. 2 is a right side view of a hydraulic lifting/lowering device according to the first preferred embodiment of the present invention.
Figure 3:
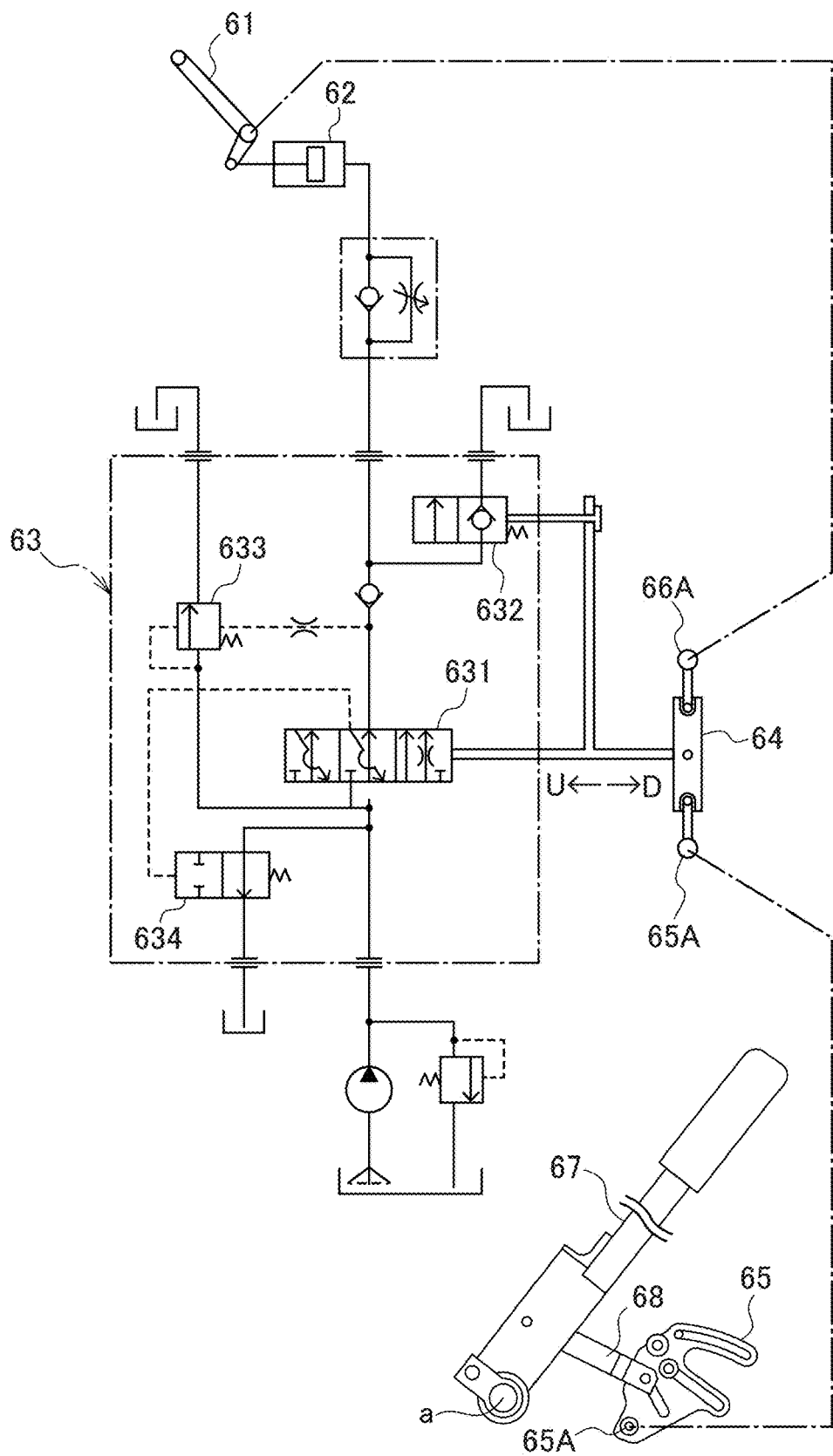
FIG. 3 is a hydraulic circuit diagram for lifting/lowering according to the first preferred embodiment of the present invention.
Figure 4:
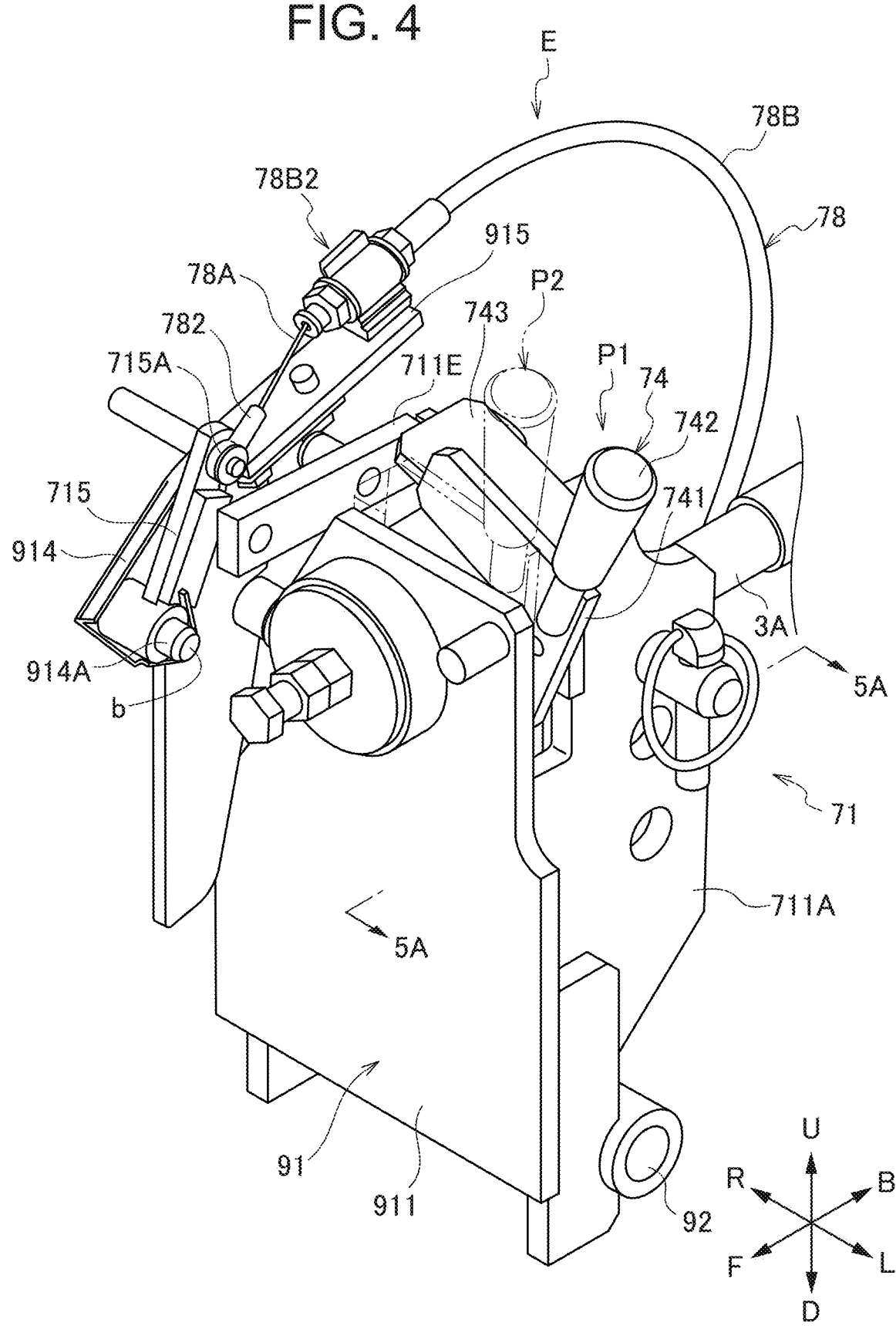
FIG. 4 is a perspective view of a load detector according to the first preferred embodiment of the present invention as viewed from the upper left front.
Figure 5:
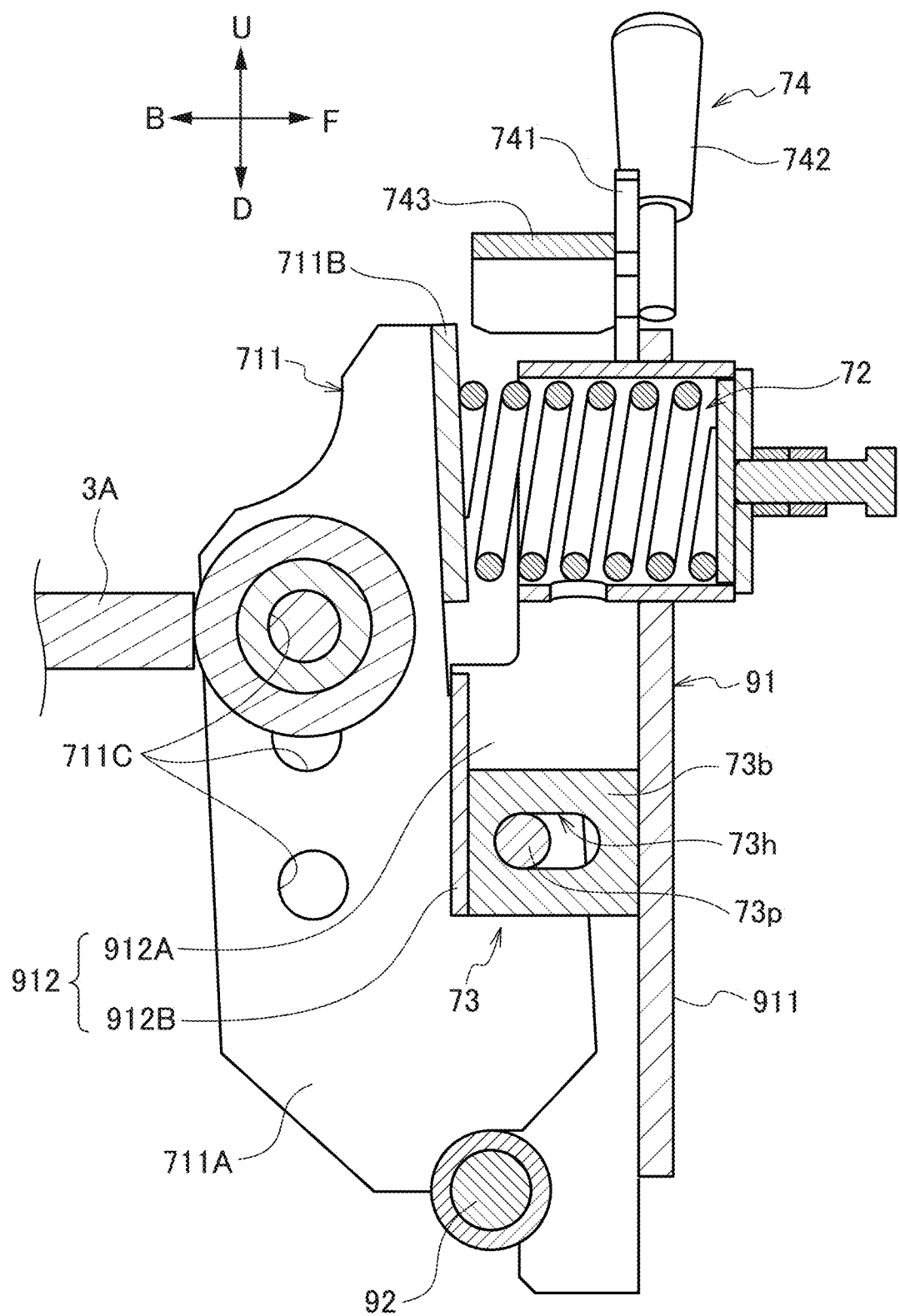
FIG. 5 is a cross-sectional view of 5A-5A in FIG. 4.
Figure 6:
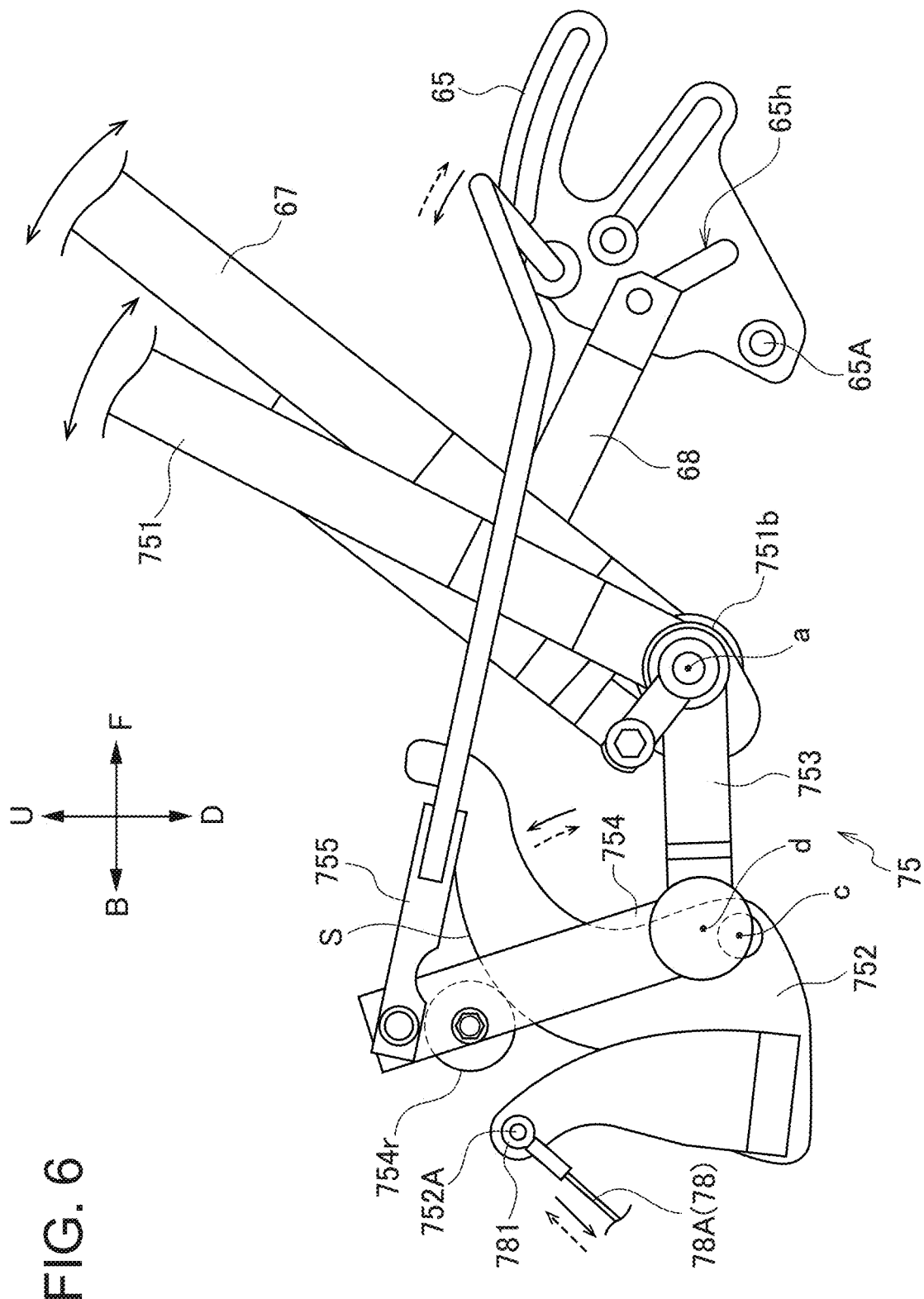
FIG. 6 is a right side view for explaining an intermediate linkage according to the first preferred embodiment of the present invention.

The configuration of the hydraulic lifting/lowering device according to the present preferred embodiment will be described with reference to FIGS. 1 to 6. FIG. 2 is a right side view of the hydraulic lifting/lowering device according to the preferred embodiment. FIG. 3 is a hydraulic circuit diagram for lifting/lowering according to the present preferred embodiment. FIG. 4 is a perspective view of the load detector according to the present preferred embodiment as viewed from the upper left front. FIG. 5 is a cross-sectional view of 5A-5A in FIG. 4. FIG. 6 is a right side view for explaining the intermediate linkage according to the present preferred embodiment.

As illustrated in FIG. 2, the hydraulic lifting/lowering device 5 (tractor 1) includes a hydraulic lifting/lowering driver 6 and a mechanical linkage 7. The lifting/lowering driver 6 can lift and lower the three-point linkage 3. The tiller 4 mounted to the three-point linkage 3 is lifted up and down according to the lifting/lowering drive of the three-point linkage 3. The mechanical linkage 7 transmits the lifting/lowering operation amount of the three-point linkage 3 to the lifting/lowering driver 6. Details of the mechanical linkage 7 will be described below. The lifting/lowering driver 6 includes right and left lift arms 61, a lift cylinder 62, a control valve 63, a balance arm 64, a position arm 65, a position arm shaft 65A, a feedback arm shaft 66A, a position lever 67, and a position plate 68.

As illustrated in FIG. 1, the right and left lift arms 61 suspend and support the right and left lower links 3B via the right and left supports. The lift arm 61 is hydraulically driven by the lift cylinder 62 so as to be vertically swingable. The lift cylinder 62 lifts and lowers the three-point linkage 3 via the lift arm 61. The lift cylinder 62 is housed in the cylinder case 28.

The control valve 63 controls the lift cylinder 62. As illustrated in FIG. 3, the control valve 63 may include a spool 631, a descending valve 632, a relief valve 633, and an unload valve 634, for example. The control valve 63 may be connected to the lift cylinder 62 via a drop speed adjusting valve. The control valve 63 is housed in the cylinder case 28. The spool 631 is always biased in the downward direction D by a biasing means (e.g., a spring).

The balance arm 64 is swingably connected to an end of the spool 631. The position arm shaft 65A is locked and connected to one end of the balance arm 64 via an operation pin, and the feedback arm shaft 66A is locked and connected to the other end of the balance arm 64 via the operation pin. The feedback arm shaft 66A is interlocked and connected to the lift arm 61 via a feedback linkage (not illustrated).

The position arm 65 is fixed to the outer end of the position arm shaft 65A. When the position arm 65 is rotated, the balance arm 64 swings about a locking point of the feedback arm shaft 66A with the operation pin. Thus, the spool 631 is shifted to the ascending side or the descending side, and the lift arm 61 performs a driving ascending operation or a dead weight descending operation. The actuation of the lift arm 61 is transmitted via the feedback linkage and converted into rotation of the feedback arm shaft 66A. When the feedback arm shaft 66A is rotated, the spool 631 is shifted in the opposite direction via the balance arm 64. The spool 631 returns to the neutral position when the feedback arm shaft 66A is rotated to a predetermined rotational position corresponding to the rotational operation position of the position arm 65. As described above, arbitrarily rotating the position arm 65 allows the lift arm 61 to be lifted and lowered to a position corresponding to the position arm 65.

The position lever 67 sets a control target height of the tiller 4. The position lever 67 is disposed on the right side of the driver seat. The position lever 67 is disposed so as to be swingable back and forth about a fulcrum a positioned near the rear side of the position arm 65. The fulcrum a is a fulcrum common to the control adjustment lever 751 to be described below. The position lever 67 is disposed more to the driver seat 272 side (left side) than the control adjustment lever 751. The position lever 67 is interlocked and connected to the position arm 65 via an elongated hole 65h and the position plate 68. Since the spool 631 is biased in the downward direction D by the biasing means, the position arm 65 is rotated and biased clockwise in a side view from the right side (see, e.g., FIG. 2). Thus, the rear end of the elongated hole 65h is engaged with and in contact with the position plate 68.

As the position lever 67 is swung toward the backward direction (counterclockwise direction in FIG. 2) about the fulcrum a, the position arm 65 engaged and supported by the position plate is rotated backward (counterclockwise direction in FIG. 2) against the biasing force. Thus, the lift arm 61 is raised to a position corresponding to the position arm 65. On the other hand, as the position lever 67 is swung toward the forward direction F (clockwise direction in FIG. 2) about the fulcrum a, the position arm 65, which is rotated and biased, rotates following the position lever 67. Thus, the lift arm 61 is lowered to a position corresponding to the position arm 65.

The mechanical linkage 7 will then be described in detail. The mechanical linkage 7 includes the load detector 71, a biasing mechanism 72, a limiting mechanism 73, an operation tool 74, an intermediate linkage 75, and a cable 78. As illustrated in FIG. 2, the vehicle body 2 may include a first cable fixing portion 241 to which a cover portion 78B to be described below is fixed on the intermediate linkage 75 side of the rear end of the vehicle body 2 (T/M case 24). As illustrated in FIGS. 2, 4, and 5, a support 91 is fixed to the rear end of the vehicle body 2 (cylinder case 28). The support 91 includes a vertical wall portion 911 connected to the rear portion of the vehicle body 2 (cylinder case 28), a linkage portion 912 which is U-shaped in a top view, an outer wall portion 913 which extends in the upward and downward direction outside the lateral direction of the vertical wall portion 911, a swing support portion 914 which supports a swing 715 to be described below, and a second cable fixing portion 915 to which the cover portion 78B is fixed. The linkage portion 912 includes right and left side portions 912A which extend backward from the vertical wall portion 911, and a rear portion 912B which extends in the lateral direction so as to connect the right and left side portions 912A.

The load detector 71 detects the amount of change in traction load via the three-point linkage 3, and transmits the amount of change in traction load to the intermediate linkage 75 via the cable 78. The load detector 71 includes the load detector 711 and the swing 715.

The load detector 711 detects the amount of change in traction load via the three-point linkage 3. The load detector 711 is supported by the support 91 so as to be swingable and displaceable in the forward and backward direction via a first support shaft 92. The load detector 711 swings back and forth according to a traction load transmitted through the top link 3A. The load detector 711 includes right and left side wall portions 711A, a vertical wall portion 711B to which the side wall portions 711A are fixed, connection holes 711C in the side wall portions 711A, an extension portion 711E which extends forward from the vertical wall portion 711B, and a contact portion 711F which contacts the swing 715.

The vertical wall portion 711B is provided on the free end side (upper side) of the load detector 711. The linkage portion 912 of the support 91 enters between the right and left vertical wall portions 711B. The top link 3A or a top link bracket supporting the top link 3A can be connected to the connection hole 711C. The extension portion 711E extends from the vertical wall portion 711B toward the forward direction. The extension portion 711E is disposed more to the right side than the side wall portion 711A. The contact portion 711F extends rightward from the extension portion 711E at the front of the extension portion 711E. Thus, when the load detector 711 swings forward in response to an increase of the traction load, the contact portion 711F moves forward and comes into contact with the swing 715.

The swing 715 swings back and forth according to the back and forth swing of the load detector 711. The swing 715 is supported by the swing support portion 914 via a second support shaft 914A extending in the lateral direction. The swing 715 is swingable about a fulcrum b passing through the axial center of the second support shaft 914A. The swing 715 swings forward by being pushed forward from the contact portion 711F which moves forward. When there is no contact with the contact portion 711F (i.e., when no forward force is exerted from the contact portion 711F), the swing 715 swings backward by a biasing mechanism (not illustrated). For example, the swing 715 is pulled backward to a predetermined position by the spring force of the torsion spring mounted to the second support shaft 914A.

The swing 715 includes a second mounting portion 715A to which a cable 78 (a second connecting portion 782 to be described below) is mounted. The second mounting portion 715A is disposed on the free end side. The second mounting portion 715A is positioned above the load detector 711. The second mounting portion 715A is positioned farther rearward than the front end of the lower link 3B. The second mounting portion 715A is positioned farther rearward than a first mounting portion 752A to be described below in a state where no traction load is applied. The second mounting portion 715A is positioned more forward than the front end of the top link 3A. The second mounting portion 715A is a mounting portion for draft control. When the first lifting/lowering operation amount according to the amount of change in traction load is selected as the lifting/lowering operation amount transmitted to the lifting/lowering driver 6, the second connecting portion 782 is mounted to the second mounting portion 715A toward the forward direction.

The biasing mechanism 72 swings and biases the load detector 711 in a direction (backward) resisting a traction load applied to the load detector 711. As illustrated in FIG. 5, the biasing mechanism 72 may include a spring having elasticity in the forward and backward direction.

The limiting mechanism 73 limits the back and forth swing range of the load detector 711. The limiting mechanism 73 may include a through hole 711h, an elongated hole 912h, a rubber block 73b, and a linkage pin 73p. The through hole 711h is located in the load detector 711. Specifically, the through holes 711h face the right and left side wall portions 711A, respectively. The elongated hole 912h is provided in the support 91 and is elongated in the forward and backward direction. Specifically, the elongated hole 912h faces the through hole 711h in each of the right and left side portions 912A of the linkage portion 912. The rubber block 73b is fitted in a space between the vertical wall portion 911 of the support 91 and the linkage portion 912 (side portion 912A and rear portion 912B). In the rubber block 73b, an elongated hole 73h having a forward and backward length shorter than that of the elongated hole 912h of the support 91 faces the elongated hole 912h of the support 91. The linkage pin 73p is inserted into each through hole 711h, each elongated hole 912h, and each elongated hole 73h.

The back and forth swing range of the load detector 711 is limited by the forward and backward length of each elongated hole 912h of the support 91. When the limiting mechanism 73 limits the back and forth swing of the load detector 711, the linkage pin 73p of the limiting mechanism 73 collides with the rubber block 73b.

The load detector 711 is held in a reference posture extending vertically upward from the first support shaft 92 by the action of the biasing mechanism 72 and the limiting mechanism 73. When the traction load exceeds a predetermined value, the load detector 711 swings and displaces forward from the reference posture against the action of the biasing mechanism 72 in conjunction with the increase of the traction load. The load detector 711 swings and displaces backward by the action of the biasing mechanism 72 in conjunction with the decrease of the traction load, and returns to the reference posture.

The operation tool 74 switches a first state in which the load detector 711 detects the traction load and a second state in which the load detector 711 does not detect the traction load. The operation tool 74 includes a swing plate 741 supported to be swingable in the lateral direction on the support 91, an operation handle 742 extending in an upward direction U from the swing plate 741, and a contact member 743 extending backward from the swing plate 741. The contact member 743 moves between the non-contact position and the contact position. In the non-contact position (first operation position P1), the contact member 743 does not contact the load detector 711 (vertical wall portion 711B), and the back and forth swing of the load detector 711 is allowed. On the other hand, at the contact position, the contact member 743 comes into contact with the load detector 711 to prevent the load detector 711 from swinging back and forth. At the contact position (second operation position P2), the contact member 743 is sandwiched between the vertical wall portion 711B and the swing plate 741.

The operation tool 74 swings in the lateral direction about an axis extending in the forward and backward direction. The operation tool 74 is selectively positioned and held in either the first operation position P1 (left side) or the second operation position P2 (right side) by a detent mechanism. When the operation tool 74 is positioned and held at the first operation position P1, the contact member 743 is positioned at a non-contact position, and the load detector 71 enters the first state. On the other hand, when the operation tool 74 is positioned and held at the second operation position P2, the contact member 743 is positioned at the contact position, and the load detector 71 enters the second state. The operator can perform draft control by moving the operation tool 74 to the first operation position P1.

The intermediate linkage 75 will then be described. The intermediate linkage 75 is a mechanical linkage. As illustrated in FIG. 2, the intermediate linkage 75 is interlocked and connected to the cable 78 and the lifting/lowering driver 6. The intermediate linkage 75 transmits a lifting/lowering operation amount according to the amount of change in traction load to the lifting/lowering driver 6. The intermediate linkage 75 includes a control adjustment lever 751, a cable connecting arm 752, a linkage plate 753, an adjustment arm 754, and a linkage rod 755.

The control adjustment lever 751 is a lever to adjust draft control. The control adjustment lever 751 is swingable back and forth about the fulcrum a.

The cable connecting arm 752 is swingable back and forth about a fulcrum c. The cable connecting arm 752 defines and functions as a connection destination on one side of the cable 78. The cable connecting arm 752 includes the first mounting portion 752A to which the cable 78 is mounted. Specifically, a first connecting portion 781 to be described below is mounted to the first mounting portion 752A. The cable connecting arm 752 is provided with a tension spring (not illustrated) to swinging and bias forward. The cable connecting arm 752 includes a cam surface S with a convex shape on a rear end side (a side on the roller 754r side to be described below) of the cable connecting arm 752.

The linkage plate 753 extends backward from the proximal end (a support shaft extending from the right side surface of the cylinder case 28 in the right direction R) of the control adjustment lever 751. The linkage plate 753 is swingable about the fulcrum a. The relative positions of the control adjustment lever 751 and the linkage plate 753 are fixed. Therefore, the linkage plate 753 also rotates about the fulcrum a according to the operation of the control adjustment lever 751.

The adjustment arm 754 is mounted to the tip (rear end) of the linkage plate 753 so as to be swingable back and forth about the fulcrum d. A roller 754r as a cam follower is mounted to the adjustment arm 754. The adjustment arm 754 is provided with a torsion spring to swing and bias the adjustment arm 754 forward. The roller 754r abuts on the cam surface S of the cable connecting arm 752 from the rear by the forward bias and swing of the adjustment arm 754 and follows the cam surface S.

The linkage rod 755 is bridged over the position arm 65 and the cable connecting arm 752. The linkage rod 755 transmits the swing and displacement of the adjustment arm 754 according to the following of the cam surface S of the roller 754r to the position arm 65.

As illustrated in FIG. 1, at least a portion of the intermediate linkage 75 is positioned farther rearward than the front end of the lower link 3B of the three-point linkage 3. In the present preferred embodiment, at least a portion of the cable connecting arm 752 and at least a portion of the adjustment arm 754 are positioned farther rearward than the front end of the lower link 3B. The intermediate linkage 75 (mechanical linkage 7) has a sensitivity adjuster to adjust operation sensitivity when the lifting/lowering driver 6 is interlocked with the swing 715. In the present preferred embodiment, the sensitivity adjuster includes the control adjustment lever 751, the cable connecting arm 752, the linkage plate 753, the adjustment arm 754, and the linkage rod 755.

Since the relative position of the control adjustment lever 751 and the linkage plate 753 is fixed, the linkage plate 753 rotates downward about the fulcrum a (counterclockwise direction in FIG. 6) and the fulcrum d displaces downward as the operator operates the control adjustment lever 751 to position the control adjustment lever 751 backward (counterclockwise in FIG. 6). Thus, the distance between the contact point of the roller 754r with respect to the cable connecting arm 752 and the fulcrum c of the cable connecting arm 752 is reduced, and the lever ratio to bring the adjustment arm 754 into contact with the cable connecting arm 752 by the control adjustment lever 751 is reduced. Therefore, the rotation of the adjustment arm 754 becomes sensitive to the rotation of the cable connecting arm 752. In other words, the operation sensitivity of the lifting/lowering driver 6 becomes sensitive to the swing of the swing 715, and the responsiveness when the tiller 4A raises is improved when the traction load exceeds a predetermined value.

On the other hand, as the control adjustment lever 751 is positioned forward (clockwise direction in FIG. 6), the linkage plate 753 rotates upward about the fulcrum a (clockwise in FIG. 6), and the fulcrum d displaces upward. Thus, the distance between the contact point of the roller 754r with respect to the cable connecting arm 752 and the fulcrum c of the cable connecting arm 752 is increased, and the lever ratio to bring the adjustment arm 754 into contact with the cable connecting arm 752 by the control adjustment lever 751 is increased. Therefore, the rotation of the adjustment arm 754 becomes insensitive to the rotation of the cable connecting arm 752. In other words, the operation sensitivity of the lifting/lowering driver 6 becomes insensitive to the swing of the swing 715, and the responsiveness when the tiller 4A raises becomes gradual when the traction load exceeds a predetermined value.

The cable 78 will then be described. The cable 78 is interlocked according to the amount of change in traction load detected by the load detector 711. The cable 78 is interlocked and connected to the load detector 71 and the lifting/lowering driver 6. Specifically, the cable 78 is connected to the swing 715 and the sensitivity adjuster. One end of the cable 78 is connected to the intermediate linkage 75 toward the forward direction of the tractor 1. The other end of the cable 78 is connected to the load detector 711 toward the forward direction of the tractor 1. The cable 78 includes a first connecting portion 781 which is a connecting portion on one side of the cable 78 and a second connecting portion 782 which is a connecting portion on the other side of the cable 78.

The first connecting portion 781 is connected on the intermediate linkage 75 side. Specifically, the first connecting portion 781 is connected to the cable connecting arm 752. The second connecting portion 782 is connected on the load detector 711 (load detector 71) side. The second connecting portion 782 is connected to the swing 715. The second connecting portion 782 is mounted to the second mounting portion 715A at a position higher than the first connecting portion 781.

The cable 78 is a push-pull cable. The cable 78 includes an inner cable 78A and a cover portion 78B. The inner cable 78A swings according to the swing of the load detector 711. The inner cable 78A can move inside an outer cable 78B3 to be described below. The first connecting portion 781 is disposed at one end of the inner cable 78A, and the second connecting portion 782 is disposed at the other end of the inner cable 78A. Therefore, the inner cable 78A is directly connected to the swing 715. The inner cable 78A is directly connected to the cable connecting arm 752.

The cover portion 78B covers the outside of the inner cable 78A. The cover portion 78B has a first fixing portion 78B1 fixed to the first cable fixing portion 241, a second fixing portion 78B2 fixed to the second cable fixing portion 915, and an outer cable 78B3. The first fixing portion 78B1 is positioned at the end of the outer cable 78B3 on the intermediate linkage 75 side, and the second fixing portion 78B2 is positioned at the end of the outer cable 78B3 on the load detector 711 side. The second fixing portion 78B2 is fixed to the second cable fixing portion 915 at a position higher than the first connecting portion 781.

As illustrated in FIGS. 2 and 4, the cable 78 includes a portion (extension portion E) extending from the second connecting portion 782 toward the backward direction of the tractor 1. The cable 78 extends curvedly. Specifically, the cable 78 extends in a C shape or a U shape, in a side view of the tractor 1. Therefore, when the second connecting portion 782 swings forward together with the swing 715, the first connecting portion 781 is pulled backward, in a side view of the tractor 1. When the second connecting portion 782 swings backward together with the swing 715, the first connecting portion 781 is pulled forward. In other words, when a force in the forward direction F is applied to the second connecting portion 782, a force in the backward direction B is applied to the first connecting portion 781, and when a force in the backward direction B is applied to the second connecting portion 782, a force in the forward direction F is applied to the first connecting portion 781.

The draft control will then be described. When a traction load of the traction type tiller 4A becomes larger than a predetermined value in the tilling work using the traction type tiller 4A, the load detector 711 is swung forward, and the swing 715 is pushed by the contact portion 711F and swings forward. Thus, when the second connecting portion 782 of the cable 78 swings forward together with the swing 715, the first connecting portion 781 is pulled backward. Thus, the cable connecting arm 752 rotates backward about the fulcrum c, and the adjustment arm 754 swings backward following the cable connecting arm 752. The linkage rod 755 is pulled backward together with the adjustment arm 754, and the position arm 65 rotates backward about the position arm shaft 65A. Thus, the lift arm 61 is raised to a position corresponding to the position after the rotation of the position arm 65. The displacement of the position arm 65 corresponds to a lifting/lowering operation amount. Therefore, the control valve 63 controls the lift cylinder 62 according to the lifting/lowering operation amount (amount of displacement in the position arm 65).

When the load of the tiller 4 falls below a predetermined value with the lift arm 61 being raised, the lifting operation of the lift arm 61 is stopped. Since draft control in which the tiller 4A automatically lifts up and down according to the traction load can be performed in the tilling work, the occurrence of an engine stall caused by the increase of the traction load can be avoided.

In the mechanical linkage 7, the configuration described above enables the cable 78 to carry a portion of the transmission path to transmit the amount of change in traction load from the load detector 711 to the lifting/lowering driver 6. Therefore, the amount of change in the traction load can be transmitted to the lifting/lowering driver 6 without increasing the number of plate-like or rod-like link members constituting the mechanical intermediate linkage 75. Thus, increasing the number of the link members can be reduced or prevented, and the structure of the mechanical linkage can be made less complicated.

The cable 78 includes an extension portion E extending from the second connecting portion 782 toward the backward direction of the tractor 1. One end of the cable 78 is connected to the intermediate linkage 75 toward the forward direction, and the other end of the cable 78 is connected to the load detector 711 toward the forward direction. Thus, an operator positioned in the rear of the tractor 1 can recognize the connecting portions (the first connecting portion 781 and the second connecting portion 782) by tracing the cable 78 from the rear of the tractor. Thus, the operator can easily perform the maintenance work such as inspection and replacement work of the cable 78. In addition, the operator can easily carry the second connecting portion 782 to the second mounting portion 715A by gripping the extension portion E so that the second connecting portion 782 is positioned more to the front side of the operator than the extension portion E. Therefore, the operator can easily mount the second connecting portion 782 and easily perform the maintenance work.

The cable 78 extends curvedly so that when the second connecting portion 782 swings forward with the swing 715, the first connecting portion 781 is pulled backward, and when the second connecting portion 782 swings backward with the swing 715, the first connecting portion 781 is pulled forward, in a side view of the tractor 1. In addition, the second connecting portion 782 is mounted to the first mounting portion 752A at a position higher than the first connecting portion 781. The operator can carry the second connecting portion 782 to the mounting portion without causing the operator to move significantly by bending the cable in the maintenance work. In addition, since the second connecting portion 782 is positioned at a position higher than the first connecting portion 781, the second connecting portion can be mounted at a position close to the height of the operator's eye line. The operator can easily perform the maintenance work.

The tractor 1 includes cable fixing portions (a first cable fixing portion 241 and a second cable fixing portion 915). Fixing the cover portion 78B by the cable fixing portions allows the inner cable 78A to be stably swung. Thus, the mechanical linkage 7 can accurately transmit the lifting/lowering operation amount according to the amount of change in traction load to the lifting/lowering driver 6, so that a high quality draft control can be executed.

The cable 78 is connected to the swing 715 and the sensitivity adjuster. Thus, the number of link members connecting the swing 715 and the sensitivity adjuster can be reduced, and the structure of the hydraulic lifting/lowering device 5 is simplified.

At least a portion of the intermediate linkage 75 is positioned farther rearward than the front end of the lower link 3B. Thus, the intermediate linkage 75 can be easily confirmed from the rear of the tractor 1, so that the maintainability can be improved.

The second mounting portion 715A is positioned above the load detector 711. Thus, when the second mounting portion 715A is visually recognized from the rear of the tractor 1, the second mounting portion 715A can be visually recognized above the load detector 711, and the load detector 711 is hardly overlapped with the second mounting portion 715A. The second connecting portion and the mounting portion are easily confirmed from the rear of the tractor 1, and the second connecting portion 782 is easily mounted and removed. Therefore, the switching work can be easily performed. A space including the second mounting portion 715A is not required in front of the load detector 711.

The second mounting portion 715A is positioned farther rearward than the front end of the lower link 3B. Since the distance from the rear of the tractor 1 to the second mounting portion 715A is closer than that to the front end of the lower link 3B, the second connecting portion 782 is easily mounted and removed from the rear of the tractor 1. Therefore, the maintenance work can be easily performed.

The second mounting portion 715A is positioned farther rearward than the first mounting portion 752A in a state where no traction load is applied. Since the distance from the rear of the tractor 1 to the second mounting portion 715A is closer than that to the first mounting portion 752A, the second connecting portion 782 is easily mounted and removed from the rear of the tractor 1. Therefore, the maintenance work can be easily performed.

Modified Example

Figure 7:
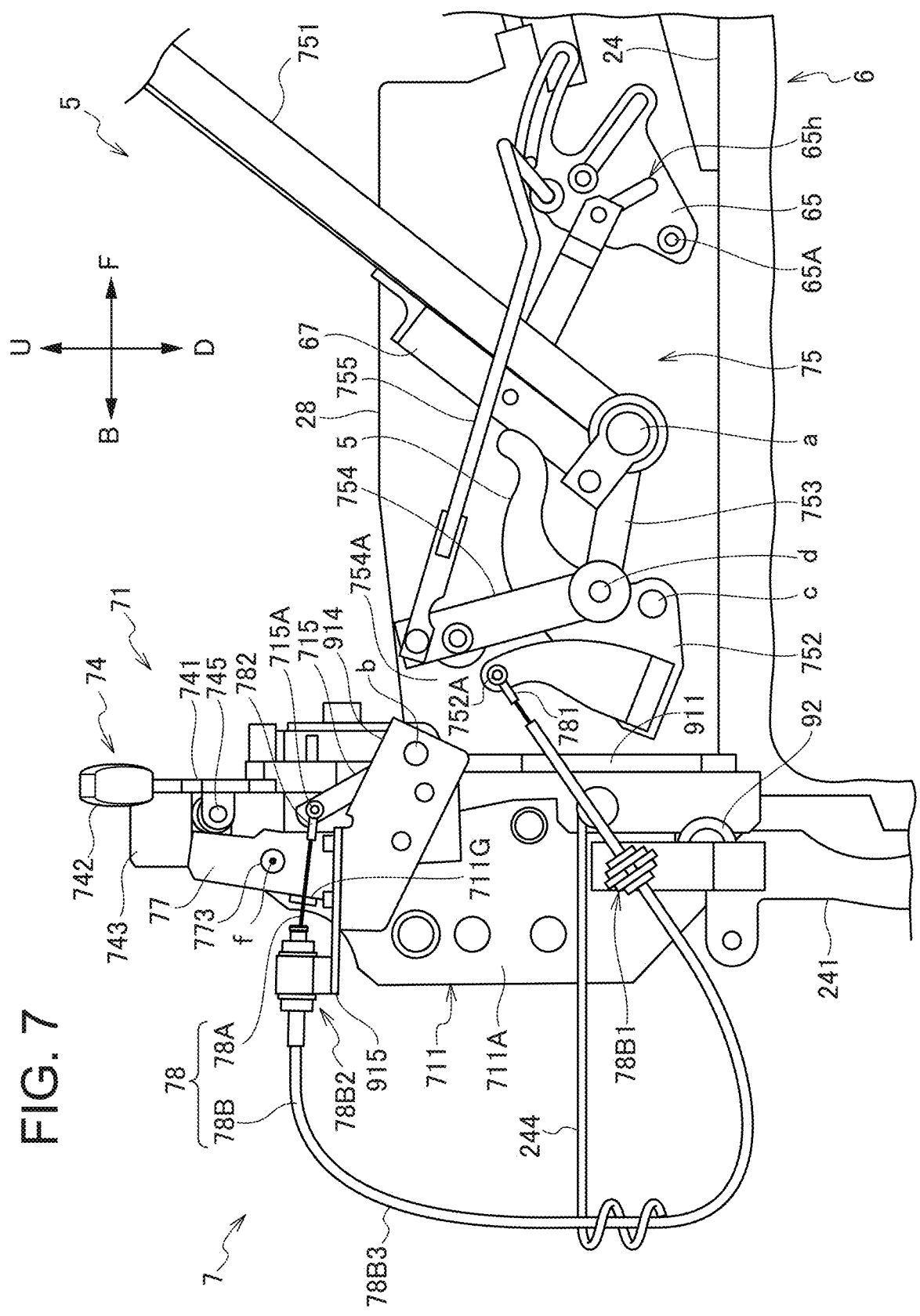
FIG. 7 is a right side view of a hydraulic lifting/lowering device according to a modified example of a preferred embodiment of the present invention.
Figure 8:
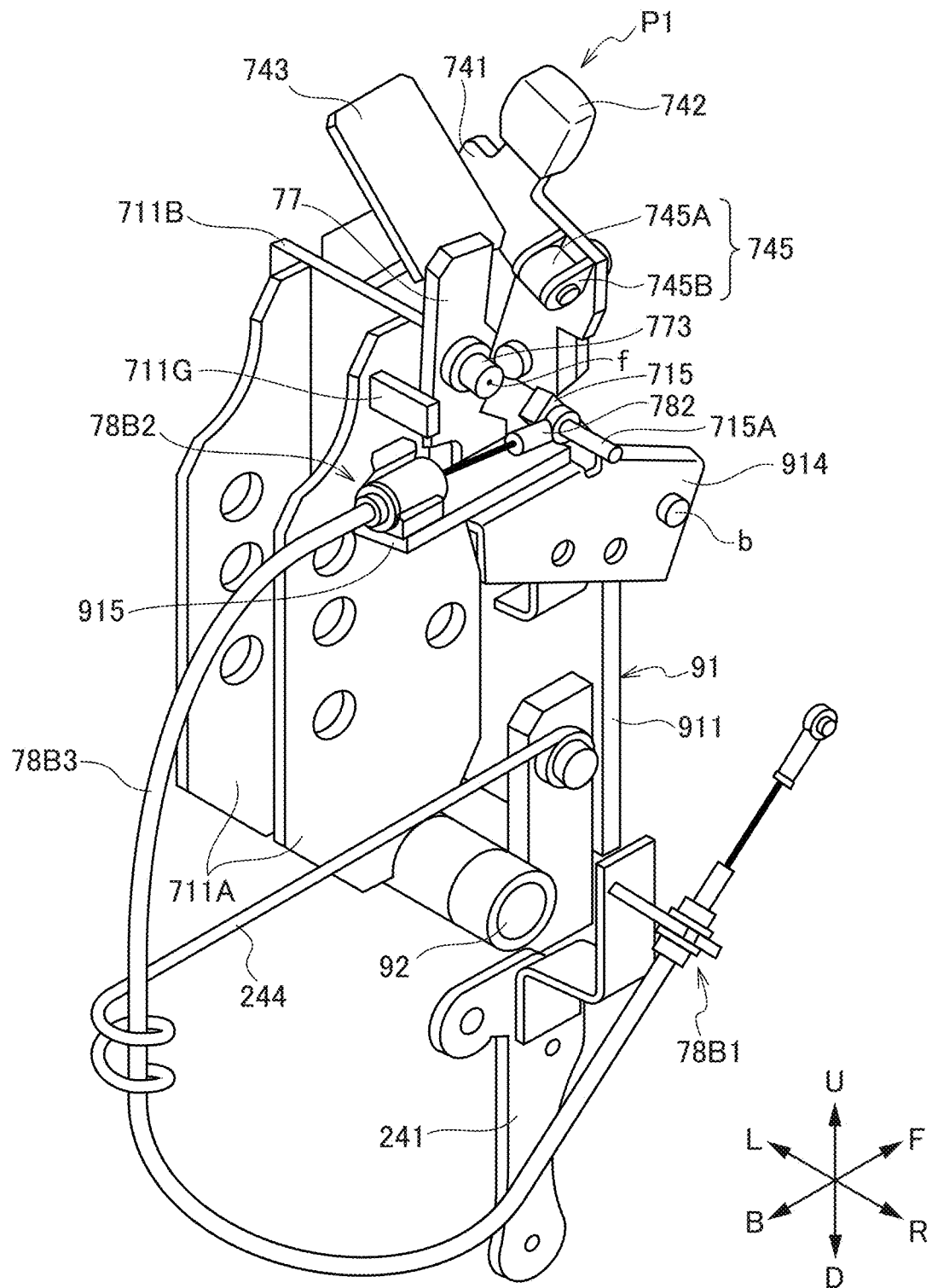
FIG. 8 is a perspective view of a load detector according to the modified example as viewed from the upper right rear.
Figure 9:
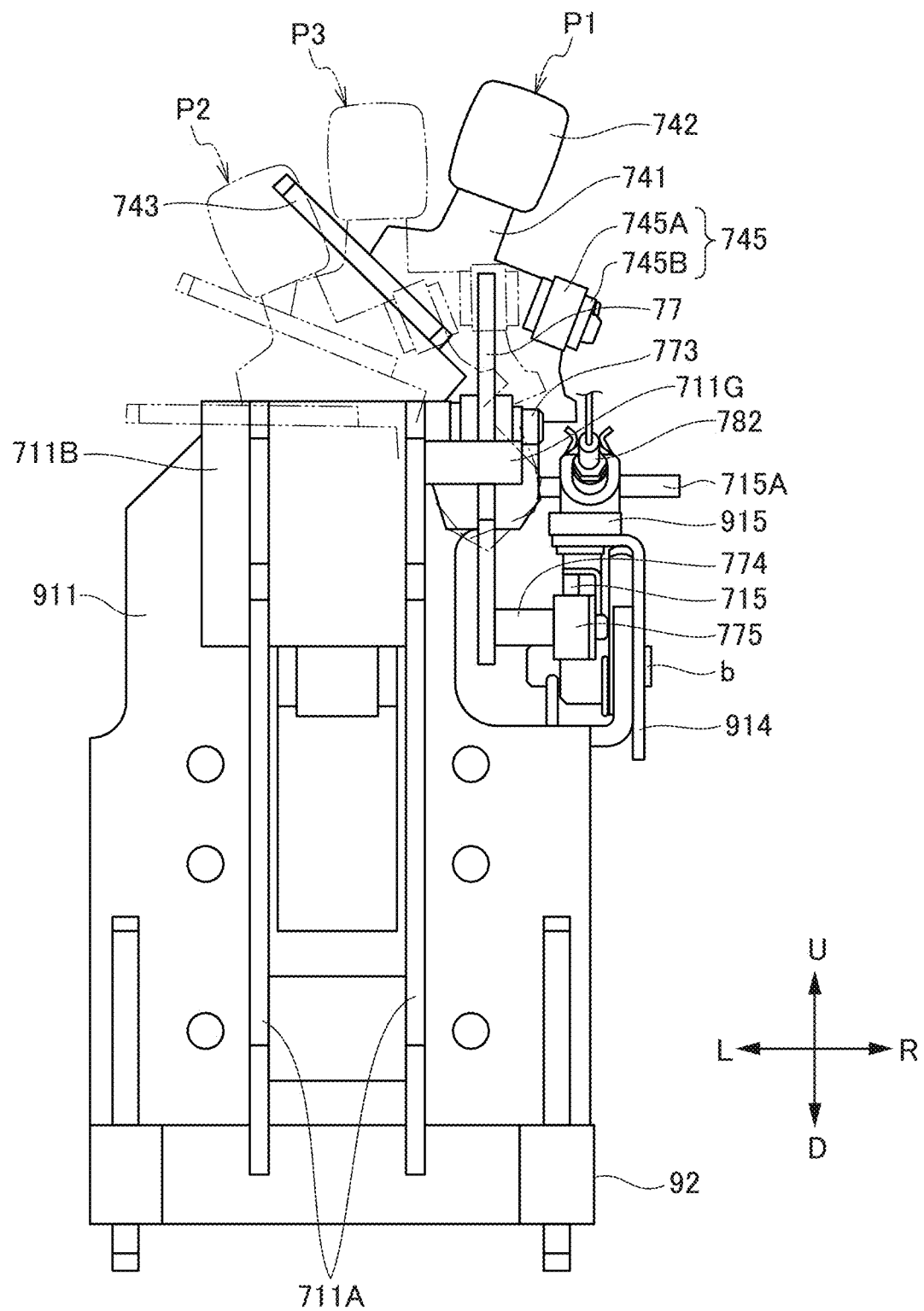
FIG. 9 is a rear view of the load detector according to the modified example as viewed from the rear.
Figure 10:
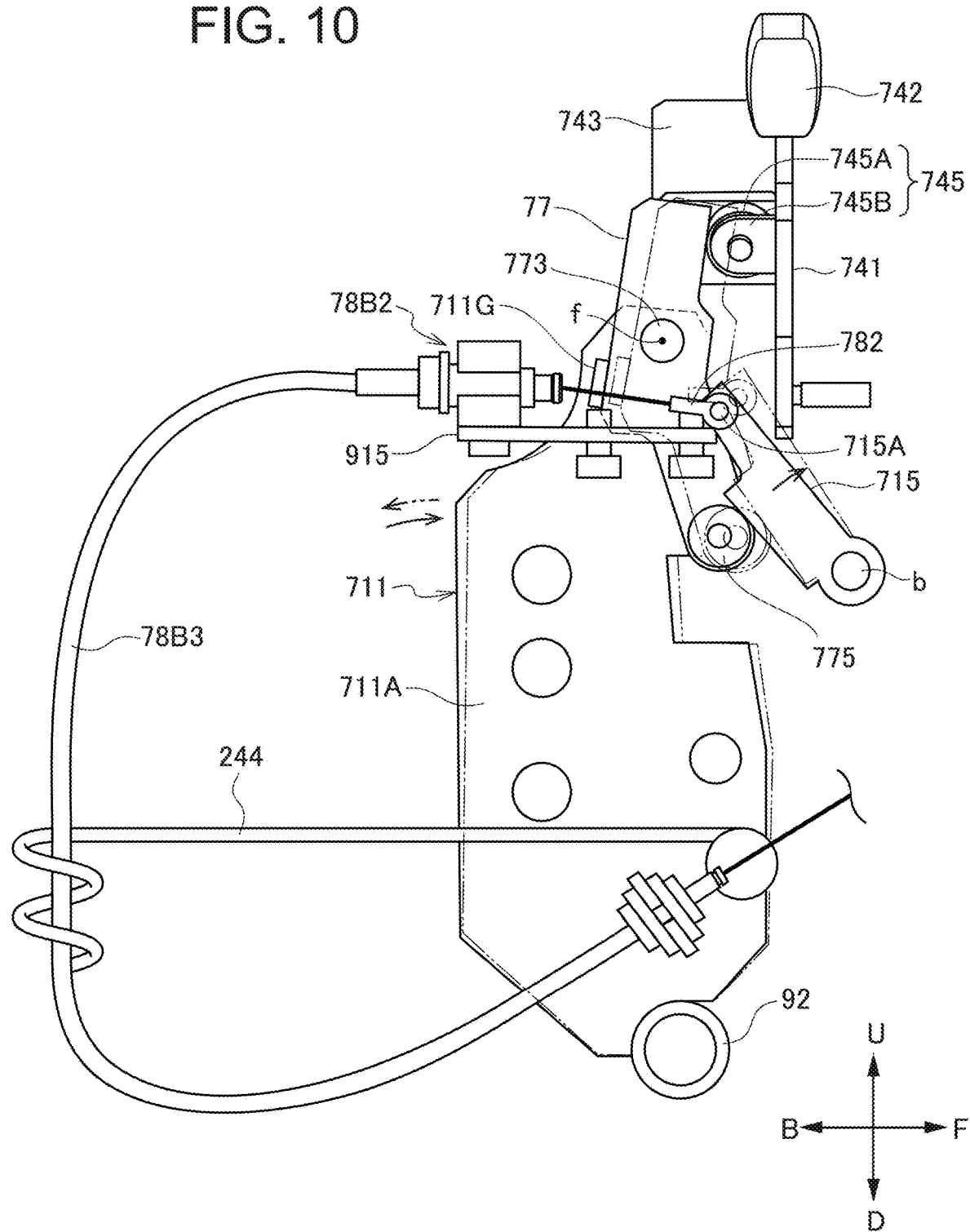
FIG. 10 is a right side view of the load detector according to the modified example.
Figure 11:
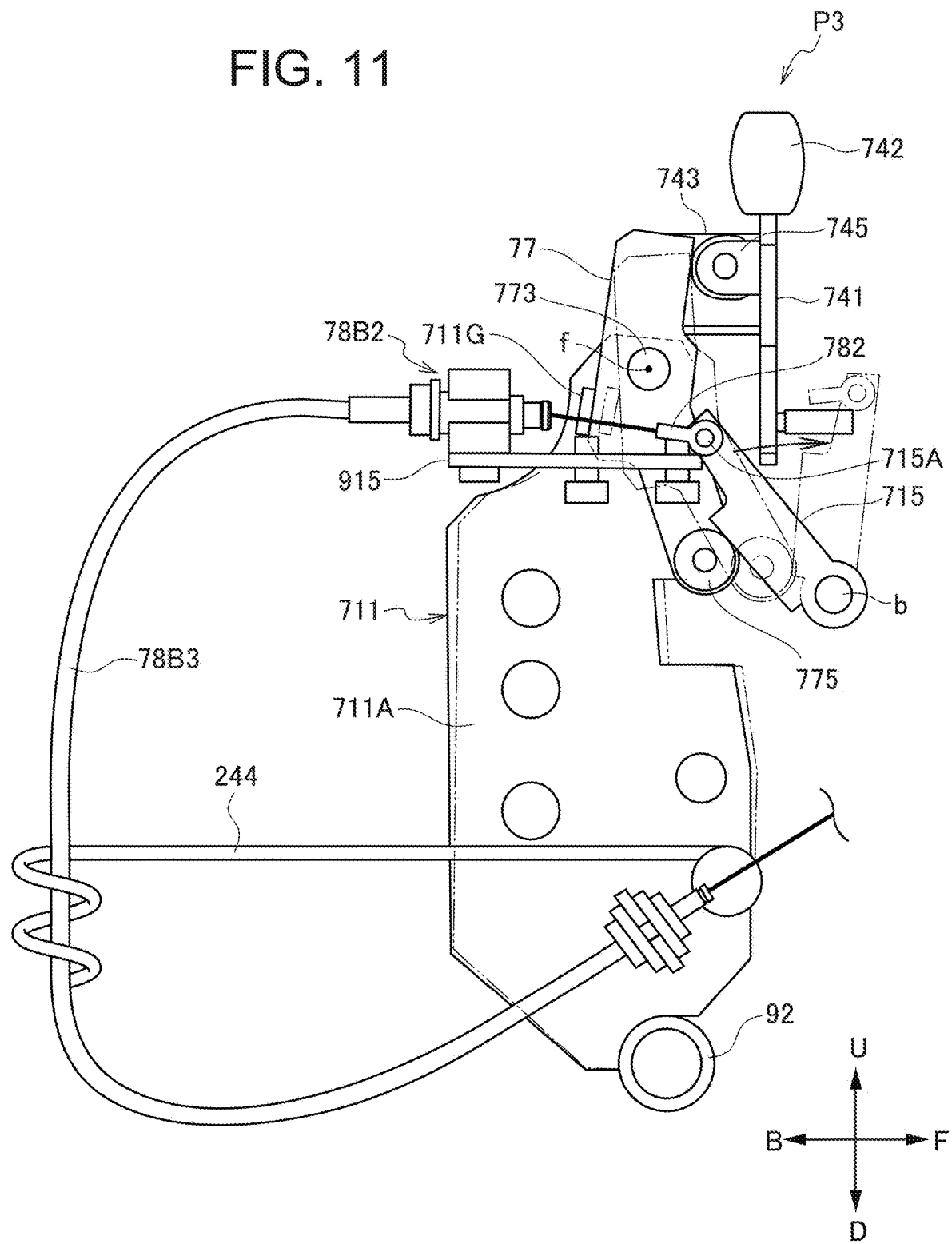
FIG. 11 is a right side view of the load detector according to the modified example.

A modified example of the first preferred embodiment will then be described mainly with reference to FIGS. 7 to 11. FIG. 7 is a right side view of a hydraulic lifting/lowering device according to the modified example. FIG. 8 is a perspective view of a load detector according to the modified example as viewed from the upper right rear. FIG. 9 is a rear view of the load detector according to the modified example as viewed from the rear. FIG. 10 is a right side view of the load detector according to the modified example. FIG. 11 is a right side view of the load detector according to the modified example. Note that the same structure as described above will not be explained.

The mechanical linkage 7 in the modified example includes an amplification swing 77. The amplification swing 77 is supported by the load detector 711 so as to be swingable. Specifically, the amplification swing 77 is supported by the load detector 711 via a third support shaft 773 extending in the lateral direction. Thus, the amplification swing 77 is swingable about a fulcrum f. The upper portion of the amplification swing 77 is positioned above the fulcrum f, and the lower portion of the amplification swing 77 is positioned below the fulcrum f.

The amplification swing 77 swings back and forth according to the back and forth swing of the load detector 711. The amount of change in traction load is amplified by the back and forth swing of the amplification swing 77. A contact roller 775 rotatable about a fulcrum of a fourth support shaft 774 is mounted to the amplification swing 77 via the fourth support shaft 774 extending in the lateral direction. Specifically, the contact roller 775 is mounted to a lower portion of the amplification swing 77. The contact roller 775 contacts the swing 715.

The load detector 71 includes an amplification contact portion 711G in contact with the amplification swing 77. The amplification contact portion 711G extends outward in the lateral direction (in the present modification, from the right side wall portion 711A in the right direction L) from the side wall portion 711A. In the present modification, the load detector 71 does not have an extension portion 711E and a contact portion 711F, which differs from the first preferred embodiment.

The operation tool 74 includes a receiving portion 745 to receive the amplification swing 77. The receiving portion 745 includes a receiving roller 745A to receive the amplification swing 77 and a support portion 745B to support the receiving roller 745A. The operation tool 74 switches a first state, a second state and a third state. As described above, the first state is a state in which the load detector 711 detects a traction load. In the first state, the lifting/lowering operation amount according to the amount of change in traction load which is not amplified by the back and forth swing of the amplification swing 77 is transmitted to the lifting/lowering driver 6. The second state is a state in which the load detector 711 does not detect a traction load. The third state is a state in which the lifting/lowering operation amount according to the amount of change in traction load amplified by the back and forth swing of the amplification swing 77 is transmitted to the lifting/lowering driver. Therefore, in the third state, the amount of change in traction load detected by the load detector 711 is amplified.

As illustrated in FIG. 9, the operation tool 74 is selectively positioned and held in either the first operation position P1 (right side), the second operation position P2 (left side), and a third operation position (center). When the operation tool 74 is positioned and held at the first operation position P1, the contact member 743 is positioned at a non-contact position. In addition, the receiving portion 745 does not contact the amplification swing 77. The load detector 71 enters the first state. When the operation tool 74 is positioned and held at the second operation position P2, the contact member 743 is positioned at a contact position, and the load detector 71 enters the second state. When the operation tool 74 is positioned and held at the third operation position P3, the contact member 743 is positioned at a non-contact position. In addition, the receiving portion 745 contacts the amplification swing 77. The load detector 71 enters the third state.

As illustrated in FIG. 10, in the first state, when the load detector 711 swings forward in response to an increase of the traction load, the amplification contact portion 711G moves forward. The forward movement of the amplification contact portion 711G allows the amplification swing 77 to be pushed forward. Since the receiving portion 745 (the receiving roller 745A) does not contact the amplification swing 77, the amplification swing 77 is pushed forward only by an amount according to the swing of the load detector 711. The contact roller 775 coming into contact with the swing 715 moves forward by the amount that the amplification swing 77 is pushed forward, and the swing 715 swings forward according to the moving amount of the contact roller 775. Thus, when the second connecting portion 782 of the cable 78 swings forward together with the swing 715, the first connecting portion 781 is pulled backward.

As illustrated in FIG. 11, in the third state, as in the first state, when the load detector 711 swings forward in response to an increase of the traction load, the amplification contact portion 711G moves forward and the amplification swing 77 is pushed forward. Since the receiving portion 745 (the receiving roller 745A) comes into contact with the amplification swing 77, the upper portion of the amplification swing 77 is not pushed forward, while the lower portion of the amplification swing 77 is pushed forward. Consequently, in FIG. 11, the amplification swing 77 swings counterclockwise about the fulcrum f. Therefore, the amplification swing 77 swings relative to the load detector 711. Thus, the lower portion of the amplification swing 77, specifically, the contact roller 775 moves forward by the amount of swing of the amplification swing 77 in addition to the amount of swing of the load detector 711. Since the contact roller 775 moves forward by the amount that the amplification swing 77 is pushed forward, in the third state, the swing 715 swings further forward than in the first state even under the same traction load as in the first state. Therefore, the swing of the amplification swing 77 increases the amount of change in traction load.

As described above, in the modified example, the amount of change in traction load is amplified by the back and forth swing of the amplification swing 77. Thus, the tiller 4A can be quickly lifted and lowered according to the change of the traction load. Consequently, even when the traction load rapidly increases, the engine stall caused by the increase of the traction load can be avoided.

The third state in which a lifting/lowering operation amount according to the amount of change in traction load amplified by the back and forth swing of the amplification swing 77 is transmitted to the lifting/lowering driver 6, and the first state in which a lifting/lowering operation amount according to the amount of change in traction load not amplified by the back and forth swing of the amplification swing 77 is transmitted to the lifting/lowering driver 6, are switched. Thus, the operator can lift and lower the three-point linkage 3 according to the condition of the soil in which the traction work is to be performed (e.g., hardness of soil, and content ratio of stone, rock and wood).

The vehicle body 2 may have a fourth cable fixing portion 244 to which the cover portion 78B is fixed. The front end of the fourth cable fixing portion 244 is supported, and the fourth cable fixing portion 244 may extend backward. The rear end of the fourth cable fixing portion 244 may be provided with a spiral portion extending in a spiral shape. The cover portion 78B may be able to insert into the spiral portion. The cover portion 78B may be fixed by inserting the cover portion 78B into the spiral portion. Thus, the cover portion 78B is fixed at the three points of the first fixing portion 78B1, the second fixing portion 78B2, and the fourth cable fixing portion 244, so that the cover portion 78B can be prevented from swinging due to, for example, vibration caused by traveling. Thus, the vibration of the first fixing portion 78B1 and the second fixing portion 78B2 is suppressed, the load applied to the first mounting portion 752A and the second mounting portion 715A is reduced, and the damage of the first mounting portion 752A and the second mounting portion 715A can be reduced.

Second Preferred Embodiment

Figure 12:
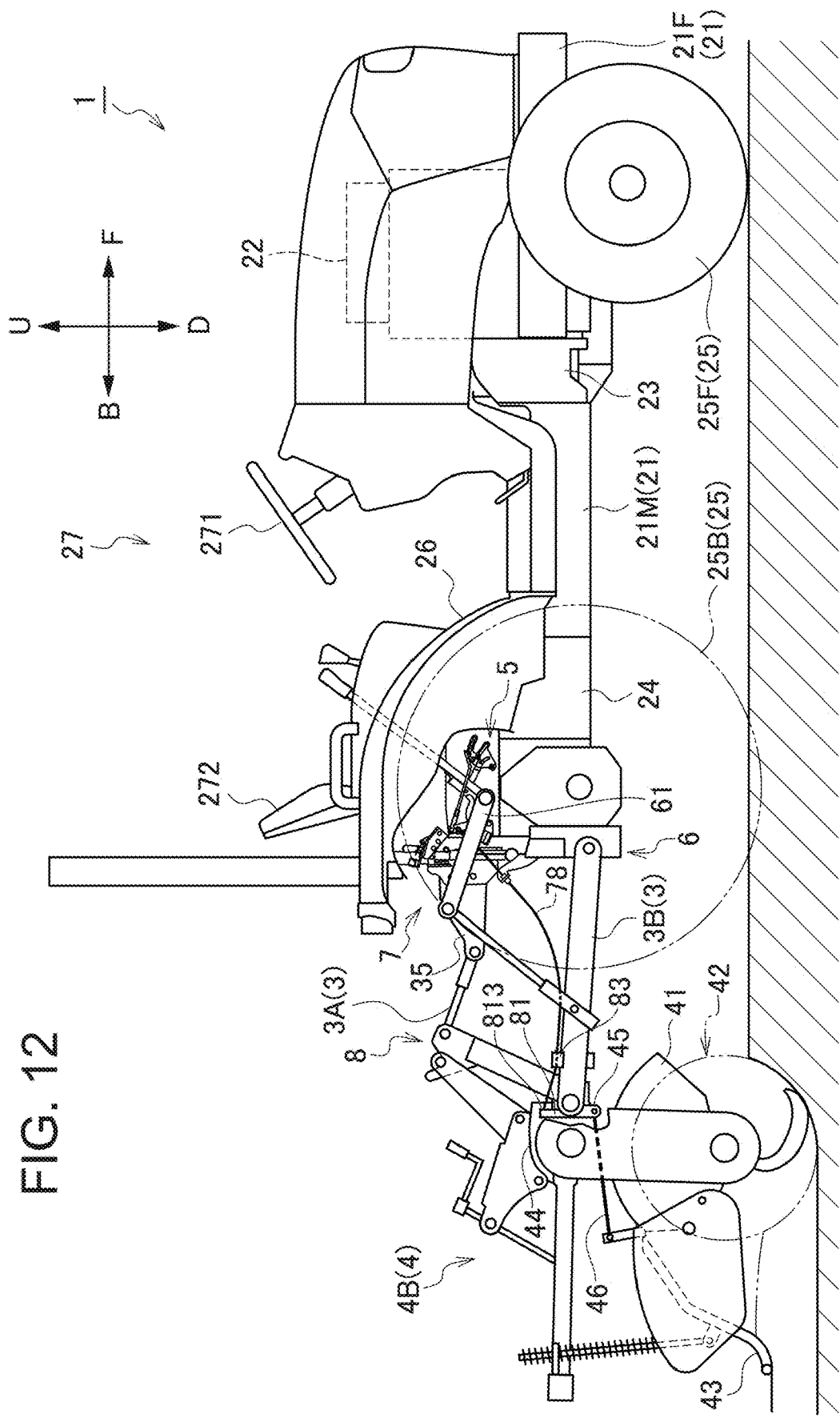
FIG. 12 is a right side view of a tractor according to a second preferred embodiment of the present invention.
Figure 13:
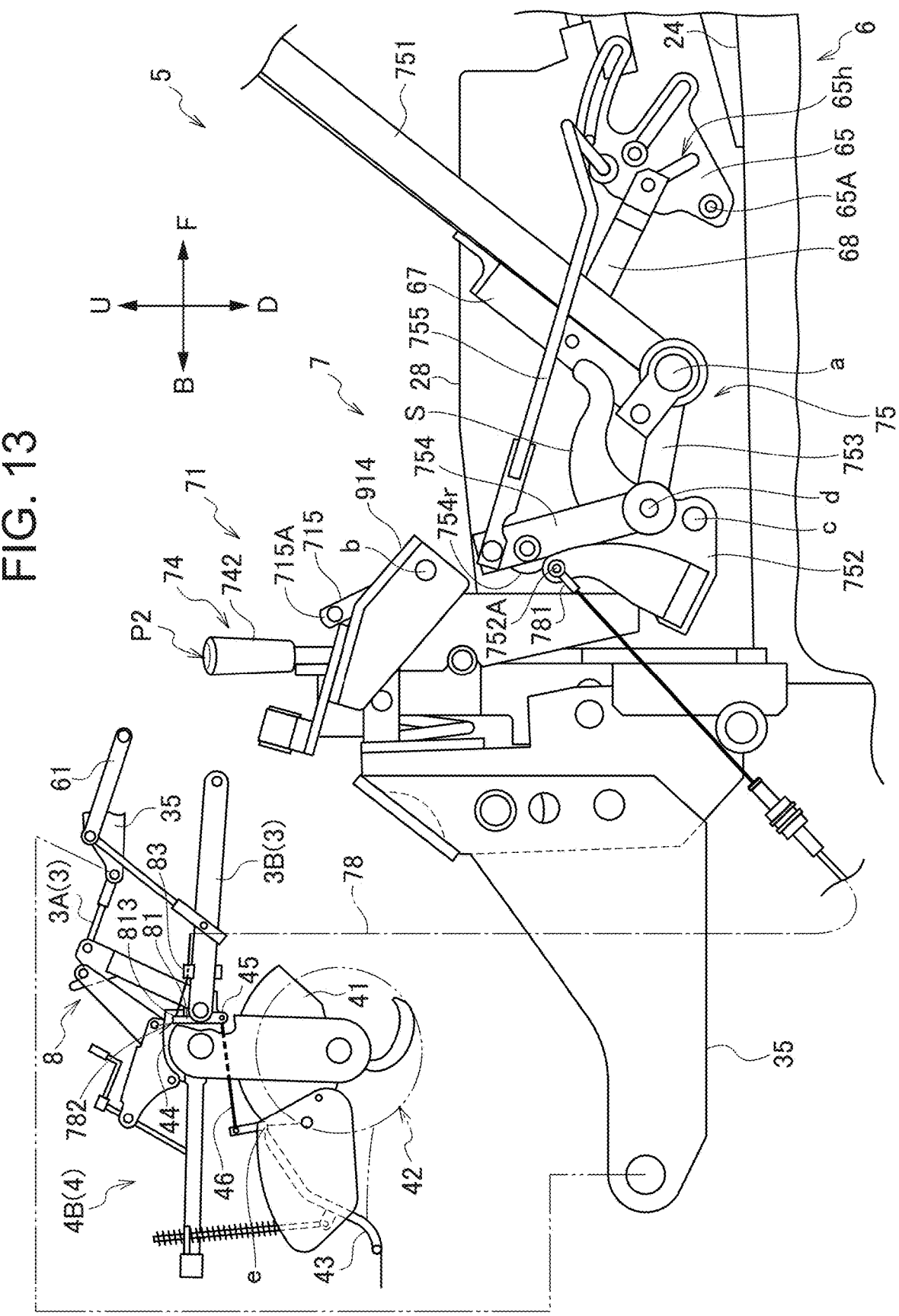
FIG. 13 is a right side view of a hydraulic lifting/lowering device according to the second preferred embodiment of the present invention.

A second preferred embodiment of the present invention will be described below. The tractor 1 may be replaceable with a traction type tiller 4A and a rotary tiller 4B. In the first preferred embodiment, since the tractor 1 including the traction type tiller 4A has been described, a tractor 1 including the rotary tiller 4B will then be described mainly with reference to FIGS. 12 and 13. FIG. 12 is a right side view of the tractor according to the second preferred embodiment. FIG. 13 is a right side view of a hydraulic lifting/lowering device according to the second preferred embodiment. Note that the same structure as described above will not be described.

As illustrated in FIGS. 12 and 13, the rotary tiller 4B can be mounted to the three-point linkage 3. The rotary tiller 4B can be mounted to and removed from the tractor 1 (three-point linkage 3) by mounting and removing the rotary tiller 4B via a hitch 8. The hitch 8 is provided at the rear of the three-point linkage 3. The hitch 8 is used to connect the tiller 4 (rotary tiller 4B).

The hitch 8 includes a linkage 81 and a third cable fixing portion 83. The linkage 81 swings back and forth together with a swing arm 45 to be described below. Therefore, the linkage swings back and forth according to the amount of change in tilling depth. The linkage 81 includes a third mounting portion 813 to which the second connecting portion 782 is mounted. The third mounting portion 813 is a mounting portion for automatic tilling depth control. When the second lifting/lowering operation amount according to the amount of change in tilling depth is selected as the lifting/lowering operation amount transmitted to the lifting/lowering driver 6, the second connecting portion 782 is mounted to the third mounting portion 813. The third mounting portion 813 is positioned farther rearward than the rear end of the top link 3A. The third cable fixing portion 83 has the cover portion 78B fixed thereto. A bracket 35 to support the top link 3A is mounted to the load detector 711. The top link 3A is shorter than the top link 3A in FIG. 1.

The rotary tiller 4B includes a rotor portion 41, a tilling cover 42 covering the rotor portion 41 from above, a ground body (rear cover) 43 to detect the amount of change in the tilling depth of the rotary tiller 4B, a transmission case portion 44, a swing arm 45 provided on the transmission case portion 44 so as to be swingable back and forth, and a linkage link 46 bridged over the lower free end of the swing arm 45 and the ground body 43. The ground body 43 is a rear cover to prevent scattering of soil during tilling and averaging tilling traces. The ground body is provided at the rear end of the tilling cover 42. The ground body 43 is vertically swingable about a fulcrum e.

The linkage 81 is rotatably provided on the rear of the three-point linkage 3 with the central portion of the linkage 81 as a fulcrum. When the rotary tiller 4B is connected to the three-point linkage 3 via the hitch 8, one end of the linkage 81 is engaged and connected to an engaging recess (not illustrated) formed in the swing arm 45. Thus, the linkage 81 rotates in accordance with the swing of the swing arm 45. The third mounting portion 813 is provided at the other end of the linkage 81. The third mounting portion 813 includes a second connecting portion 782 of the cable 78 mounted thereto. Thus, the ground body 43 and the control valve 63 are linked via the cable 78.

The automatic tilling depth control will then be described. When tilling work is being performed by using the rotary tiller 4B and the rotary tiller 4B starts to go deeper than the target tilling depth, the ground body 43 is lifted and swung accordingly. Thus, the linkage link 46 moves forward, the swing arm 45 swings forward, and the linkage 81 rotates counterclockwise. The rotation of the linkage 81 pulls the second connecting portion 782 of the cable 78 backward and also pulls the first connecting portion 781 backward. Thus, the cable connecting arm 752 rotates backward about the fulcrum c and the position arm 65 rotates backward about the position arm shaft 65A, as in the draft control. The lift arm 61 is raised to a position corresponding to the position after the rotation of the position arm 65, and the rotary tiller 4B is also raised. When the ground body 43 is restored to the original posture, the lifting operation is stopped and the original tilling depth is returned.

On the other hand, when tilling work is being performed by using the rotary tiller 4B and the rotary tiller 4B starts to go shallower than the target tilling depth, the ground body 43 is hung down and swung accordingly to loosen the inner cable 78A of the cable 78. Since the cable connecting arm 752 is swung and biased forward (clockwise direction in FIG. 13) by a tension spring, when the inner cable 78A is loosened, the cable connecting arm 752 swings forward (clockwise direction) so as to absorb the slack of the inner wire 36a. Thus, the adjustment arm 754 swings forward following the cable connecting arm 752. The linkage rod 755 is pushed forward together with the adjustment arm 754, and the position arm 65 rotates forward about the position arm shaft 65A. Thus, the lift arm 61 is lowered to a position corresponding to the position after the rotation of the position arm 65, and the rotary tiller 4B also is lowered. When the ground body 43 is restored to the original posture, the lowering operation is stopped and the original tilling depth is returned.

When automatic tilling depth control is performed, the operation tool 74 is moved to the second operation position P2. Thus, the load detector 71 enters the second state, and the load detector 711 does not swing back and forth. Therefore, the amount of change in tilling depth can be accurately detected.

The above configuration switches the connection destination of the second connecting portion 782 of the cable 78, whereby either one of the first lifting/lowering operation amount according to the amount of change in traction load and the second lifting/lowering operation amount according to the amount of change in tilling depth is selected as the lifting/lowering operation amount transmitted to the lifting/lowering driver 6. Thus, the cable 78 can selectively transmit the amount of change in traction load and the amount of change in tilling depth.

Specifically, when the second mounting portion 715A of the swing 715 is selected as the connection destination of the second connecting portion 782, the first lifting/lowering operation amount is transmitted to the lifting/lowering driver 6 as the lifting/lowering operation amount. The lifting/lowering driver 6 controls the lift cylinder 62 according to the first lifting/lowering operation amount (i.e., the amount of change in traction load). Therefore, the traction type tiller 4A can be automatically lifted and lowered according to the traction load in the tilling work.

On the other hand, when the third mounting portion 813 of the hitch 8 is selected as the connection destination of the second connecting portion 782, the second lifting/lowering operation amount is transmitted to the lifting/lowering driver 6 as the lifting/lowering operation amount. The lifting/lowering driver 6 controls the lift cylinder 62 according to the second lifting/lowering operation amount (i.e., the amount of change in tilling depth). Therefore, the rotary tiller 4B can be automatically lifted and lowered according to the tilling depth in the tilling work.

As described above, in order to switch the connection destination of the second connecting portion 782, the intermediate linkage 75 connected to the first connecting portion 781 is a linkage common to both draft control and automatic tilling depth control. Therefore, since similar functions of the draft control and the automatic tilling depth control can be combined into one linkage, the structure of the hydraulic lifting/lowering device 5 can be much less complicated.

The second mounting portion 715A is positioned more forward than the front end of the top link 3A. The third mounting portion 813 is positioned farther rearward than the rear end of the top link. When the operator performs the switching work between the draft control and the automatic tilling depth control, the operator can work between the front end and the rear end of the top link 3A in a side view of the tractor 1, and can easily perform the switching work between the draft control and the automatic tilling depth control.

The cable 78 is more flexible than a plate-like or rod-like link member used in a general mechanical linkage. Therefore, the degree of freedom in the disposition of the connection destination of the cable 78 is increased, and the structure of the hydraulic lifting/lowering device 5 can be made less complicated.

In addition, switching the connection destination of the cable 78 having a wide movable range by the flexibility allows the switching work between the draft control and the automatic tilling depth control to be easily performed.

The cable 78 includes an extension portion E extending from the second connecting portion 782 toward the backward direction of the tractor 1. The second connecting portion 782 is mounted to the second mounting portion 715A toward the forward direction. Thus, an operator positioned in the rear of the tractor 1 can easily carry the second connecting portion 782 to the second mounting portion 715A by gripping the extension portion E so that the second connecting portion 782 is positioned more to the front side of the operator than the extension portion E. Therefore, the operator can easily mount the second connecting portion 782, and can easily perform the switching work to the draft control.

The cable 78 extends curvedly so that when the second connecting portion 782 swings forward with the swing 715, the first connecting portion 781 is pulled backward, and when the second connecting portion 782 swings backward with the swing 715, the first connecting portion 781 is pulled forward, in a side view of the tractor 1. In addition, the second connecting portion 782 is mounted to the first mounting portion 752A at a position higher than the first connecting portion 781. The operator can carry the second connecting portion 782 to the mounting portion without causing the operator to move significantly by bending the cable in the maintenance work. In addition, since the second connecting portion 782 is positioned at a position higher than the first connecting portion 781, the second connecting portion can be mounted at a position close to the height of the operator's eye line. The operator can easily perform the switching work to the draft control.

The tractor 1 includes cable fixing portions (first cable fixing portion 241, second cable fixing portion 915, and third cable fixing portion 83). Fixing the cover portion 78B by the cable fixing portions allows the inner cable 78A to be stably swung. Thus, the mechanical linkage 7 can accurately transmit the lifting/lowering operation amount according to the amount of change in traction load to the lifting/lowering driver 6, so that a high quality draft control can be executed.

The cable 78 is connected to the swing 715 and the sensitivity adjuster. Thus, the number of link members connecting the swing 715 and the sensitivity adjuster can be reduced, and the structure of the hydraulic lifting/lowering device 5 is simplified.

At least a portion of the intermediate linkage 75 is positioned farther rearward than the front end of the lower link 3B. Thus, the intermediate linkage 75 can be easily confirmed from the rear of the tractor 1, so that the maintainability can be improved.

The second mounting portion 715A is positioned above the load detector 711. Thus, when the second mounting portion 715A is visually recognized from the rear of the tractor 1, the second mounting portion 715A can be visually recognized above the load detector 711, and the load detector 711 is hardly overlapped with the second mounting portion 715A. The second connecting portion and the mounting portion are easily confirmed from the rear of the tractor 1, and the second connecting portion 782 is easily mounted and removed. Therefore, the switching work can be easily performed. A space including the second mounting portion 715A is not required in front of the load detector 711.

The second mounting portion 715A is positioned farther rearward than the front end of the lower link 3B. Since the distance from the rear of the tractor 1 to the second mounting portion 715A is closer than that to the front end of the lower link 3B, the second connecting portion 782 is easily mounted and removed from the rear of the tractor 1. Therefore, the switching work can be easily performed.

The hitch 8 includes a linkage 81 to swing back and forth according to the amount of change in tilling depth. The linkage 81 includes a third mounting portion 813 to which the second connecting portion 782 is mounted. Thus, since the second connecting portion 782 of the cable 78 is directly mounted to the linkage 81 of the hitch 8, the number of members for transmitting the amount of change in tilling depth to the cable 78 can be reduced on the front side of the three-point linkage 3 as compared with the case where the second connecting portion 782 of the cable 78 is mounted.

The second mounting portion 715A is positioned farther rearward than the first mounting portion 752A in a state where no traction load is applied. Since the distance from the rear of the tractor 1 to the second mounting portion 715A is closer than that to the first mounting portion 752A, the second connecting portion 782 is easily mounted and removed from the rear of the tractor 1. Therefore, the switching work can be easily performed.

Other Preferred Embodiments

Although the present disclosure has been described in detail with reference to the preferred embodiments described above, it will be apparent to those skilled in the art that the present disclosure is not limited to the preferred embodiments described herein. The present disclosure may be practiced as modifications and variations without departing from the spirit and scope of the present disclosure as defined by the claims. Accordingly, the description herein is intended to be illustrative and has no restrictive meaning with respect to the present disclosure.

The configuration of the tractor 1 can be variously changed. For example, the tractor 1 may be of a semi-crawler specification including right and left crawlers in place of the right and left rear wheels 25B. For example, the tractor 1 may be of a full-crawler specification including right and left crawlers in place of the right and left wheels 25. For example, the tractor 1 may be of an electric specification including an electric motor in place of the engine 22. For example, the tractor 1 may be of a hybrid specification including the engine 22 and an electric motor.

The configuration of the lifting/lowering driver 6 and the configuration of the mechanical linkage 7 can be variously changed. For example, the cable 78 may include a portion extending laterally of the tractor 1. In other words, the extension portion E may extend laterally in a back view of the tractor 1 (as viewed from the rear of the tractor 1). An operator positioned on the side of the tractor 1 can easily carry the second connecting portion 782 to the second mounting portion 715A by gripping the extension portion E so that the second connecting portion 782 is positioned more to the front side of the operator than the extension portion E. Therefore, the operator can easily mount the second connecting portion 782 and can easily perform the maintenance work and/or the switching work to the draft control.

In the above preferred embodiments, the swing is provided to swing back and forth according to the back and forth swing of the load detector 711, and the swing 715 is provided with a second mounting portion 715A to which the cable 78 is mounted, but the preferred embodiments are not limited thereto. For example, the load detector 711 may be provided with the second mounting portion 715A.

In the above preferred embodiments, when the second connecting portion 782 swings forward together with the swing 715, the first connecting portion 781 is pulled backward, and when the second connecting portion 782 swings backward together with the swing 715, the first connecting portion 781 is pulled forward, in a side view of the tractor 1, but the preferred embodiments are not limited thereto. For example, the first connecting portion 781 may be pulled forward when the second connecting portion 782 swings forward, and the first connecting portion 781 may be pulled backward when the second connecting portion 782 swings backward, by a configuration for reversing the movement of the swing 715.

The linkage 81 is engaged with and connected to the engaging recess of the swing arm 45, and is rotatable, but is not limited thereto. For example, the linkage link 46 may be connected to the lower free end of the linkage 81. Thus, the linkage 81 may be swung back and forth by the linkage link 46 without the swing arm 45.

The tractor 1 in the second preferred embodiment may include the load detector 71 in the modified example of the first preferred embodiment.

The tractor 1 may include a member other than the member described above, or may include only a portion of the member described above. Therefore, for example, the lifting/lowering driver 6 and the mechanical linkage 7 may include members other than the members described above, or may have only a portion of the members described above.

The entire contents of Japanese Patent Application No. 2019-100766 (filed May 29, 2019) and Japanese Patent Application No. 2019-100767 (filed May 29, 2019) are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A tractor comprising:
a three-point linkage to which a tiller is mountable;
a hydraulic lifting/lowering driver to lift and lower the three-point linkage; and
a mechanical linkage to transmit a lifting/lowering operation amount of the three-point linkage to the lifting/lowering driver; wherein
the mechanical linkage includes:
  a load detector to detect an amount of change in traction load via the three-point linkage;
  a cable to interlock according to the amount of change in the traction load detected by the load detector; and
  an intermediate linkage interlocked and connected to the cable and the lifting/lowering driver, the intermediate linkage being capable of transmitting the lifting/lowering operation amount according to the amount of change in the traction load to the lifting/lowering driver;
the cable includes:
a first connecting portion directly connected to the intermediate linkage;
a second connecting portion directly connected to the load detector; and
a portion extending from the second connecting portion toward a backward direction of the tractor;
one end of the cable is connected to the intermediate linkage toward a forward direction of the tractor;
another end of the cable is connected to the load detector toward the forward direction of the tractor;
the load detector includes:
a mounting portion to which the second connecting portion is mounted; and
a swing to swing back and forth according to a back and forth swing of the load detector;
the cable extends curvedly so that when the second connecting portion swings forward together with the swing, the first connecting portion is pulled backward, and when the second connecting portion swings backward together with the swing, the first connecting portion is pulled forward, in a side view of the tractor; and
the second connecting portion is mounted to the mounting portion at a position higher than the first connecting portion.

2. The tractor according to claim 1, wherein
the cable includes:
an inner cable to swing according to a back and forth swing of the swing;
a cover portion that covers an outside of the inner cable; and
a cable fixing portion that fixes the cover portion.

3. The tractor according to claim 1, wherein
the mechanical linkage includes a sensitivity adjuster to adjust an operation sensitivity when the lifting/lowering driver interlocks with the swing; and
the cable is connected to the swing and the sensitivity adjuster.

4. The tractor according to claim 1, wherein at least a portion of the intermediate linkage is positioned farther rearward than a front end of a lower link of the three-point linkage.

5. The tractor according to claim 1, wherein
the mounting portion to which the second connecting portion is mounted is positioned above the load detector.

6. The tractor according to claim 1, wherein
the mechanical linkage includes:
a first mounting portion to which the first connecting portion is mounted; and
the mounting portion to which the second connecting portion is mounted as a second mounting portion; and
the second mounting portion is positioned farther rearward than the first mounting portion in a state in which a first lifting/lowering operation amount according to the amount of change in the traction load is the lifting/lowering operation amount transmitted to the lifting/lowering driver.

7. The tractor according to claim 1, wherein
the mechanical linkage includes an amplification swing that is supported by the load detector so as to be swingable to swing back and forth according to a back and forth swing of the load detector; and
the amount of change in the traction load is amplified by the back and forth swing of the amplification swing.

8. The tractor according to claim 7, wherein a state in which the lifting/lowering operation amount according to the amount of change in the traction load amplified by the back and forth swing of the amplification swing is transmitted to the lifting/lowering driver and a state in which the lifting/lowering operation amount according to the amount of change in the traction load not amplified by the back and forth swing of the amplification swing is transmitted to the lifting/lowering driver are switched.

9. The tractor according to claim 1, wherein
the cable selectively transmits the amount of change in the traction load and an amount of change in tilling depth; and
a connection destination of the second connecting portion is switched such that either one of a first lifting/lowering operation amount according to the amount of change in the traction load and a second lifting/lowering operation amount according to the amount of change in the tilling depth is selected as the lifting/lowering operation amount transmitted to the lifting/lowering driver.

10. The tractor according to claim 9, further comprising:
a mounting portion for draft control to which the second connecting portion is mounted when the first lifting/lowering operation amount is selected as the lifting/lowering operation amount; and
a mounting portion for automatic tilling depth control to which the second connecting portion is mounted when the second lifting/lowering operation amount is selected as the lifting/lowering operation amount; wherein
the mounting portion for draft control is positioned farther forward than a front end of a top link of the three-point linkage; and
the mounting portion for automatic tilling depth control is positioned farther rearward than a rear end of the top link.

11. The tractor according to claim 9, further comprising a mounting portion to which the second connecting portion is mounted when the first lifting/lowering operation amount is selected as the lifting/lowering operation amount; wherein
the second connecting portion is mounted to the mounting portion toward the forward direction of the tractor.

12. The tractor according to claim 9, wherein
the load detector swings back and forth according to the traction load transmitted through a top link of the three-point.

13. The tractor according to claim 12, wherein the cable includes:
an inner cable to swing according to a back and forth swing of the swing;
a cover portion that covers an outside of the inner cable; and
a cable fixing portion that fixes the cover portion.

14. The tractor according to claim 9, wherein
the load detector swings back and forth according to the traction load transmitted through a top link of the three-point linkage;
the mechanical linkage includes a sensitivity adjuster to adjust an operation sensitivity when the lifting/lowering driver interlocks with the swing; and
the cable is connected to the swing and the sensitivity adjuster.

15. The tractor according to claim 9, wherein at least a portion of the mechanical linkage is positioned farther rearward than a front end of a lower link of the three-point linkage.

16. The tractor according to claim 9, further comprising:
a mounting portion to which the second connecting portion is mounted when the first lifting/lowering operation amount is selected as the lifting/lowering operation amount; wherein
the load detector swings back and forth according to the traction load transmitted through a top link of the three-point linkage; and
the mounting portion is positioned above the load detector.

17. The tractor according to claim 9, further comprising a hitch to connect the tiller at a rear of the three-point linkage; wherein
the hitch includes a linkage to swing back and forth according to the amount of change in tilling depth; and
the linkage includes a mounting portion to which the second connecting portion is mounted when the second lifting/lowering operation amount is selected as the lifting/lowering operation amount.

* * * * *